United States Patent
Chen

(10) Patent No.: US 10,599,918 B2
(45) Date of Patent: Mar. 24, 2020

(54) INFORMATION PROCESSING METHOD AND INFORMATION PROCESSING APPARATUS

(71) Applicant: FUJITSU LIMITED, Kawasaki-shi, Kanagawa (JP)

(72) Inventor: Bin Chen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 16/008,488

(22) Filed: Jun. 14, 2018

(65) Prior Publication Data
US 2018/0365485 A1    Dec. 20, 2018

(30) Foreign Application Priority Data

Jun. 20, 2017    (JP) .................. 2017-120142

(51) Int. Cl.
*G06K 9/00*     (2006.01)
*G06N 7/00*     (2006.01)
*G06K 9/22*     (2006.01)
*G06N 5/02*     (2006.01)
*H04W 88/02*    (2009.01)

(52) U.S. Cl.
CPC ..... *G06K 9/00335* (2013.01); *G06K 9/00771* (2013.01); *G06K 9/22* (2013.01); *G06N 5/022* (2013.01); *G06N 7/005* (2013.01); *G06K 2009/00738* (2013.01); *H04W 88/02* (2013.01)

(58) Field of Classification Search
CPC .......... G06K 9/00335; G06K 9/00771; G06K 2009/00738; G06K 9/22; G06N 7/005; G06N 5/022; H04W 88/02
See application file for complete search history.

(56) References Cited

U.S. PATENT DOCUMENTS

| | | | |
|---|---|---|---|
| 9,729,865 B1* | 8/2017 | Kuo | ................... G06K 9/00268 |
| 2012/0314078 A1* | 12/2012 | Li | .............................. G06T 7/35 348/159 |
| 2015/0146921 A1* | 5/2015 | Ono | ......................... H04N 7/18 382/103 |
| 2016/0202065 A1 | 7/2016 | Chen | |

FOREIGN PATENT DOCUMENTS

| | | |
|---|---|---|
| JP | 2000-295242 | 10/2000 |
| JP | 2016-66314 | 4/2016 |
| JP | 2016-129309 | 7/2016 |

* cited by examiner

*Primary Examiner* — Tom Y Lu
(74) *Attorney, Agent, or Firm* — Fujitsu Patent Center

(57) ABSTRACT

An information processing apparatus includes a processor that receives a first event from a first sensor monitoring a first object and stores the first event in a first history. The processor generates and stores a second event in the first history repeatedly in absence of another event from the first sensor. The processor receives a third event from a second sensor monitoring a second object and stores the third event in a second history. The processor generates and stores a fourth event in the second history repeatedly in absence of another event from the second sensor. The processor calculates likelihood that the first object and the second object accompany each other based on the first history and the second history. The processor generates and outputs, when the likelihood exceeds a predetermined threshold value, information in which the first object and the second object are linked to each other.

6 Claims, 44 Drawing Sheets

FIG. 3

| DATE&TIME | PERSON ID | EVENT RELATED TO PERSON |
|---|---|---|
| $t_{H001}$ | H1 | START MOVING |
| $t_{H002}$ | H1 | START STOPPING |
| $t_{H003}$ | H2 | START MOVING |
| ⋮ | ⋮ | ⋮ |

FIG. 4

| DATE&TIME | PERSON ID | EVENT RELATED TO PERSON |
|---|---|---|
| $t_{H001}$ | M1 | START MOVING |
| $t_{H002}$ | M1 | START STOPPING |
| $t_{H003}$ | M2 | START MOVING |
| ⋮ | ⋮ | ⋮ |

FIG. 5

| PATTERN ID | FIRST COMBINATION | SECOND COMBINATION | THIRD COMBINATION |
|---|---|---|---|
| P1 | H1 & M1 | H2 & M2 | H3 & M3 |
| P2 | H1 & M1 | H2 & M3 | H3 & M2 |
| P3 | H1 & M2 | H2 & M1 | H3 & M3 |
| P4 | H1 & M2 | H2 & M3 | H3 & M1 |
| P5 | H1 & M3 | H2 & M1 | H3 & M2 |
| P6 | H1 & M3 | H2 & M2 | H3 & M1 |

FIG. 6

| PATTERN ID | LIKELIHOOD OF FIRST COMBINATION | LIKELIHOOD OF SECOND COMBINATION | LIKELIHOOD OF THIRD COMBINATION | PATTERN LIKELIHOOD |
|---|---|---|---|---|
| P1 | Q1(1) | Q1(2) | Q1(3) | R1 |
| P2 | Q2(1) | Q2(2) | Q2(3) | R2 |
| P3 | Q3(1) | Q3(2) | Q3(3) | R3 |
| P4 | Q4(1) | Q4(2) | Q4(3) | R4 |
| P5 | Q5(1) | Q5(2) | Q5(3) | R5 |
| P6 | Q6(1) | Q6(2) | Q6(3) | R6 |

FIG. 7

| PERSON ID | TERMINAL ID |
|---|---|
| H1 | M1 |
| H2 | M2 |
| H3 | M3 |

FIG. 9

|  | LIKELIHOOD OF COMBINATION WITH TERMINAL M1 | LIKELIHOOD OF COMBINATION WITH TERMINAL M2 | LIKELIHOOD OF COMBINATION WITH TERMINAL M3 |
| --- | --- | --- | --- |
| PERSON ID:H1 | Q(H1, M1) | Q(H1, M2) | Q(H1, M3) |
| PERSON ID:H2 | Q(H2, M1) | Q(H2, M2) | Q(H2, M3) |
| PERSON ID:H3 | Q(H3, M1) | Q(H3, M2) | Q(H3, M3) |

FIG. 10

|  | STOPPED STATE SCORE IN COMBINATION WITH MOBILE TERMINAL M1 | STOPPED STATE SCORE IN COMBINATION WITH MOBILE TERMINAL M2 | STOPPED STATE SCORE IN COMBINATION WITH MOBILE TERMINAL M3 |
|---|---|---|---|
| PERSON ID:H1 | Y(H1, M1) | Y(H1, M2) | Y(H1, M3) |
| PERSON ID:H2 | Y(H2, M1) | Y(H2, M2) | Y(H2, M3) |
| PERSON ID:H3 | Y(H3, M1) | Y(H3, M2) | Y(H3, M3) |

FIG. 11

|  | MOVING STATE SCORE IN COMBINATION WITH MOBILE TERMINAL M1 | MOVING STATE SCORE IN COMBINATION WITH MOBILE TERMINAL M2 | MOVING STATE SCORE IN COMBINATION WITH MOBILE TERMINAL M3 |
|---|---|---|---|
| PERSON ID: H1 | X(H1, M1) | X(H1, M2) | X(H1, M3) |
| PERSON ID: H2 | X(H2, M1) | X(H2, M2) | X(H2, M3) |
| PERSON ID: H3 | X(H3, M1) | X(H3, M2) | X(H3, M3) |

FIG. 21

| PREVIOUS STATE | BASIC PROBABILITY THAT CURRENT STATE IS STOPPED STATE | BASIC PROBABILITY THAT CURRENT STATE IS MOVING STATE |
|---|---|---|
| STOPPED STATE | 0.5 | 0.5 |
| MOVING STATE | 0.5 | 0.5 |

FIG. 22

| EVENT RELATED TO PERSON | FIRST PROBABILITY |
|---|---|
| STOPPED | 0.97 |
| MOVING | 0.01 |
| START STOPPING | 0.01 |
| START MOVING | 0.01 |

FIG. 23

| EVENT RELATED TO TERMINAL | SECOND PROBABILITY |
|---|---|
| STOPPED | 0.97 |
| MOVING | 0.01 |
| START STOPPING | 0.01 |
| START MOVING | 0.01 |

FIG. 25

| EVENT RELATED TO PERSON | THIRD PROBABILITY |
|---|---|
| STOPPED | 0.1 |
| MOVING | 0.1 |
| START STOPPING | 0.7 |
| START MOVING | 0.1 |

FIG. 26

| EVENT RELATED TO TERMINAL | FOURTH PROBABILITY |
|---|---|
| STOPPED | 0.1 |
| MOVING | 0.1 |
| START STOPPING | 0.7 |
| START MOVING | 0.1 |

FIG. 29

| EVENT RELATED TO PERSON | FIFTH PROBABILITY |
|---|---|
| STOPPED | 0.1 |
| MOVING | 0.1 |
| START STOPPING | 0.7 |
| START MOVING | 0.1 |

FIG. 30

| EVENT RELATED TO TERMINAL | SIXTH PROBABILITY |
|---|---|
| STOPPED | 0.1 |
| MOVING | 0.1 |
| START STOPPING | 0.7 |
| START MOVING | 0.1 |

FIG. 32

| EVENT RELATED TO PERSON | SEVENTH PROBABILITY |
|---|---|
| STOPPED | 0.1 |
| MOVING | 0.1 |
| START STOPPING | 0.7 |
| START MOVING | 0.1 |

FIG. 33

| EVENT RELATED TO TERMINAL | EIGHTH PROBABILITY |
|---|---|
| STOPPED | 0.1 |
| MOVING | 0.1 |
| START STOPPING | 0.7 |
| START MOVING | 0.1 |

INFORMATION PROCESSING METHOD AND INFORMATION PROCESSING APPARATUS

CROSS-REFERENCE TO RELATED APPLICATION

This application is based upon and claims the benefit of priority of the prior Japanese Patent Application No. 2017-120142, filed on Jun. 20, 2017, the entire contents of which are incorporated herein by reference.

FIELD

The embodiments discussed herein are related to an information processing method and an information processing apparatus.

BACKGROUND

A system may collect an event related to the movement status of a person in the image captured by a camera and an event related to the movement status of a mobile terminal held by the person based on the inertia data measured by the mobile terminal. Then, the mobile terminal is linked to the person by focusing on the motivation of both events.

However, when the transmission amounts of the events are to be suppressed, there is a problem that the person and the mobile terminal cannot be quickly linked to each other.

Related techniques are disclosed in, for example, Japanese Laid-Open Patent Publication Nos. 2000-295242, 2016-066314, and 2016-129309.

SUMMARY

According to an aspect of the present invention, provided is an information processing apparatus including a memory and a processor coupled to the memory. The processor is configured to receive a first event from a first sensor monitoring a first object. The first event indicates a state of the first object. The processor is configured to store the first event in a first history stored in the memory. The processor is configured to generate and store a second event in the first history repeatedly in absence of another event from the first sensor. The second event indicates the state indicated by the first event. The processor is configured to receive a third event from a second sensor monitoring a second object. The third event indicates a state of the second object. The second sensor is different from the first sensor. The processor is configured to store the third event in a second history stored in the memory. The processor is configured to generate and storing a fourth event in the second history repeatedly in absence of another event from the second sensor. The fourth event indicates the state indicated by the third event. The processor is configured to calculate likelihood that the first object and the second object accompany each other based on the first history and the second history. The processor is configured to generate and output, when the likelihood exceeds a predetermined threshold value, information in which the first object and the second object are linked to each other.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

BRIEF DESCRIPTION OF DRAWINGS

FIG. 3 is a diagram illustrating an example of a person event table;
FIG. 4 is a diagram illustrating an example of a terminal event table;
FIG. 5 is a diagram illustrating an example of a pattern table;
FIG. 6 is a diagram illustrating an example of a pattern likelihood table;
FIG. 7 is a diagram illustrating an example of a linkage table;
FIG. 9 is a diagram illustrating an example of a combination likelihood table;
FIG. 10 is a diagram illustrating an example of a first score table;
FIG. 11 is a diagram illustrating an example of a second score table;
FIG. 21 is a diagram illustrating an example of a basic probability table;
FIG. 22 is a diagram illustrating an example of a first probability table;
FIG. 23 is a diagram illustrating an example of a second probability table;
FIG. 25 is a diagram illustrating an example of a third probability table;
FIG. 26 is a diagram illustrating an example of a fourth probability table;
FIG. 29 is a diagram illustrating an example of a fifth probability table;
FIG. 30 is a diagram illustrating an example of a sixth probability table;

FIG. 32 is a diagram illustrating an example of a seventh probability table;

FIG. 33 is a diagram illustrating an example of an eighth probability table;

DESCRIPTION OF EMBODIMENTS

First Embodiment

Figure 1:
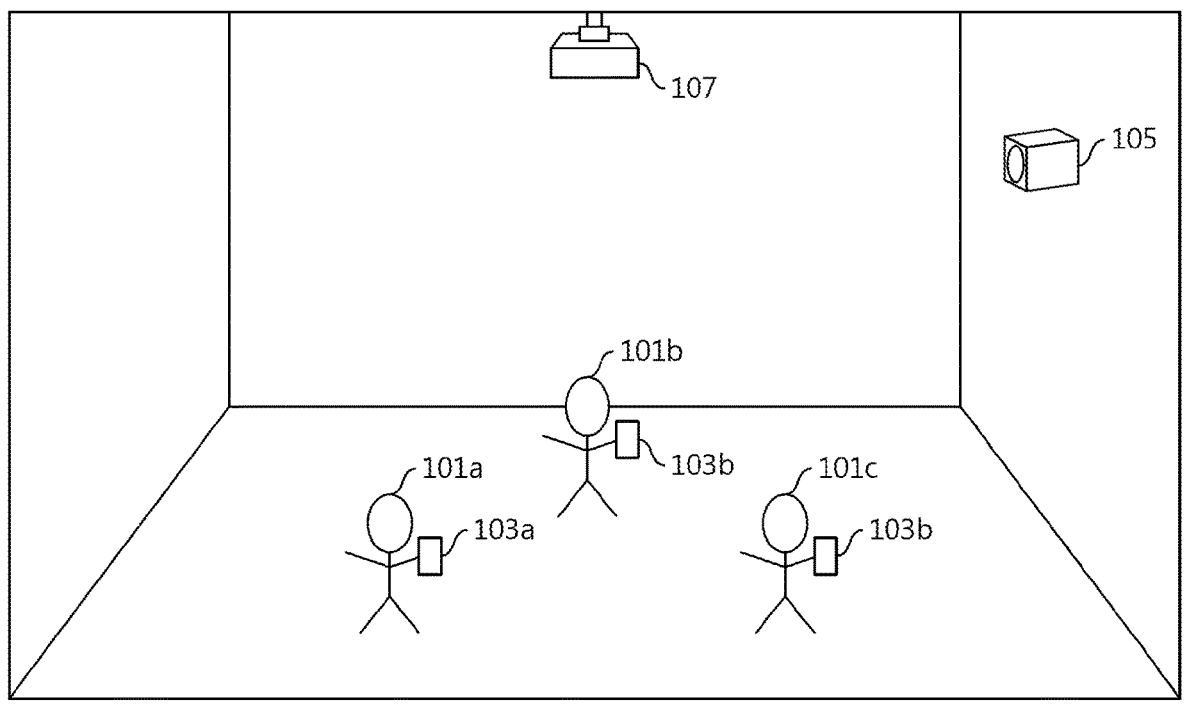
FIG. 1 is a diagram illustrating an application example of a monitoring system.

FIG. 1 illustrates an application example of a monitoring system. A camera 105 photographs the room using the infrared rays. The persons in the room 101a to 101c are photographed in the frame image of the photographed moving image.

As illustrated, the persons 101a to 101c each hold mobile terminals 103a to 103c, respectively. The terminals 103a to 103c have an inertia sensor (e.g., an acceleration sensor or a geomagnetic sensor). The terminals 103a to 103c transmit radio signals including an ID (terminal ID) for identifying the terminal 103 and the inertia data measured by the inertia sensor. An access point 107 receives the radio signals transmitted from the terminals 103a to 103c.

Figure 2:
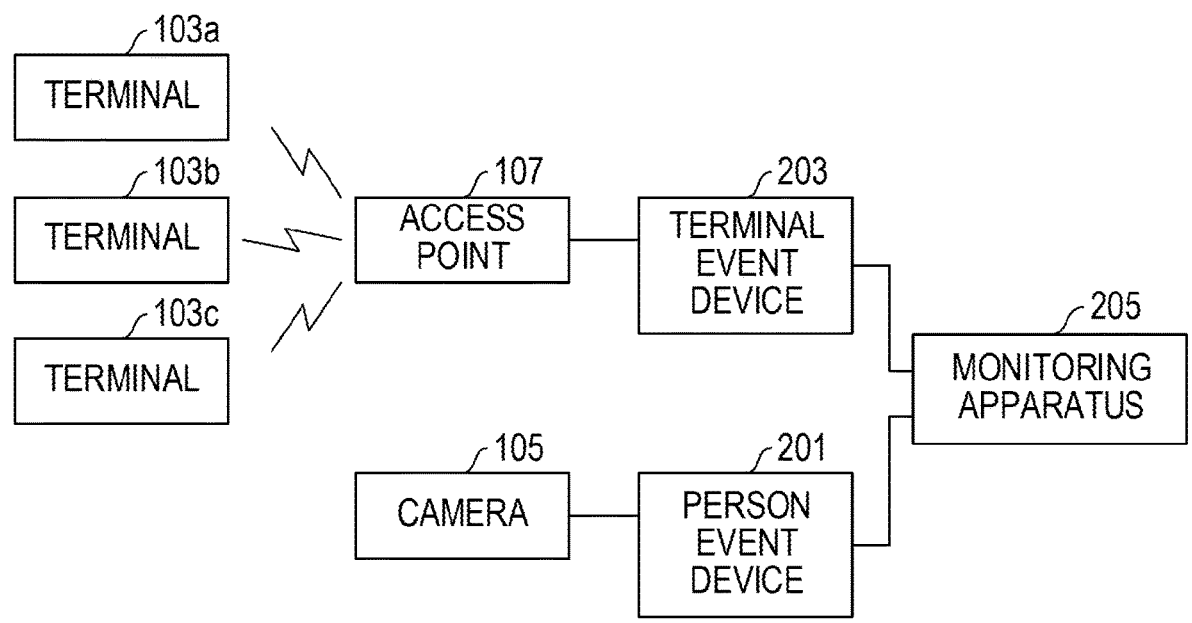
FIG. 2 is a diagram illustrating a configuration example of the monitoring system.

FIG. 2 illustrates a configuration example of the monitoring system. A person event device 201 is connected to the camera 105. The person event device 201 specifies the respective positions of the persons 101a to 101c in the room based on the frame image photographed by the camera 105. The person event device 201 traces the position of the person 101 together with the passage of time. The trajectory of the person obtained in this way is called a moving line.

Then, the person event device 201 determines whether the person 101 is in a moving state or in a stopped state. When the person event device 201 switches from the moving state to the stopped state, the person event device 201 sends an event of "start stopping" to a monitoring apparatus 205. Further, when the person event device 201 switches from the stopped state to the moving state, the person event device 201 sends an event of "start moving" to the monitoring apparatus 205. In the person event device 201, a method of generating an event related to the person 101 based on a series of frame images may be a technique in the related art.

The monitoring apparatus 205 receives an event related to the person 101 sent from the person event device 201. In the event related to the person 101, an ID (person ID) for identifying the person 101 is attached. The person event device 201 may be configured to attach a value indicating the degree of reliability with respect to the event to the event related to the person 101.

A terminal event device 203 is connected to the access point 107. The terminal event device 203 receives the terminal ID and the inertia data included in the radio signals transmitted by the terminal 103 from the access point 107. Based on the inertia data, the terminal event device 203 determines whether a source (i.e., the terminal 103) is in a moving state or in a stopped state. Then, when the terminal event device 203 switches from the moving state to the stopped state, the terminal event device 203 sends an event of "start stopping" to the monitoring apparatus 205. Further, when the terminal event device 203 switches from the stopped state to the moving state, the terminal event device 203 sends an event of "start moving" to the monitoring apparatus 205. In the terminal event device 203, a method of generating an event related to the terminal 103 based on the inertia data may be a technique in the related art.

The monitoring apparatus 205 receives an event related to the terminal 103 sent from the terminal event device 203. In the event related to the terminal 103, an ID (terminal ID) for identifying the terminal 103 is attached. The terminal event device 203 may be configured to attach a value indicating the degree of reliability with respect to the event to the event related to the terminal 103.

The monitoring apparatus 205 stores the received event related to the person 101 in the person event table held by itself. FIG. 3 illustrates an example of a person event table. The person event table in this example has a record corresponding to the event related to the person 101. The record of the person event table has a field in which the date and time are stored, a field in which the person ID is stored, and a field in which the event related to the person 101 is stored.

The date and time in the relevant field specifies the time point when the event related to the person 101 has been received, that is, the time point when the event has occurred. The person ID in the relevant field identifies the person 101 to be traced. In the event field related to the person 101, an actual event of "start stopping" or "start moving" is stored. In addition, in the following example, "stopped" or "moving," which is a pseudo-event, is stored in addition to the actual event. Pseudo-events will be described later.

In addition, the monitoring apparatus 205 stores the received event related to the terminal 103 in the terminal event table held by itself. FIG. 4 illustrates an example of a terminal event table. In this example, the terminal event table has a record corresponding to the event related to the terminal 103. The record of the terminal event table has a field in which the date and time is stored, a field in which the terminal ID is stored, and a field in which the event related to the terminal 103 is stored.

The date and time in the relevant field specifies the time when the event related to the terminal 103 has been received, that is, the time when the event has occurred. The terminal ID in the relevant field identifies the terminal 103 detected by the access point 107. In the field of the event related to the terminal 103, the actual event "start stopping" or "start moving" is stored. In the following example, "stopped" or "moving," which is a pseudo-event, is stored in addition to an actual event.

A correspondence between the person ID in the person event table and the terminal ID in the terminal event table described above is unclear. The monitoring apparatus 205 links the person ID and the terminal ID with each other based on the event related to the person 101 and the event related to the terminal 103.

The pattern for combining the person ID and the terminal ID without exception is limited, assuming that each person 101 holds a different terminal 103. FIG. 5 illustrates an example of the pattern table generated by the monitoring apparatus 205. When the number of person IDs and the number of terminal IDs are both 3, the number of combinations of person IDs and terminal IDs is 3. In addition, the number of patterns that combine the person IDs and the terminal IDs without overlap is 6.

In this example, the pattern table has a record corresponding to the pattern. The record of the pattern table has a field in which the pattern ID is stored, a field in which the person ID and the terminal ID related to a first combination are stored, a field in which the person ID and the terminal ID related to a second combination are stored, and a field in which the person ID and the terminal ID related to a third combination are stored.

The monitoring apparatus 205 calculates the likelihood for each pattern in order to make a correct linking. The likelihood of the pattern (hereinafter, referred to as the "pattern likelihood") is the sum of the likelihood for each combination of patterns. FIG. 6 illustrates an example of a pattern likelihood table for calculating the pattern likelihood.

In this example, the pattern likelihood table has a record corresponding to the pattern. The record of the pattern likelihood table has a field in which the pattern ID is stored, a field in which the likelihood of the first combination is stored, a field in which the likelihood of the second combination is stored, a field in which the likelihood of the third combination is stored, and a field in which the pattern likelihood is stored.

When the maximum pattern likelihood exceeds a threshold value, the monitoring apparatus 205 links the person ID and the terminal ID by each combination of the patterns having the pattern likelihood.

Figure 7:
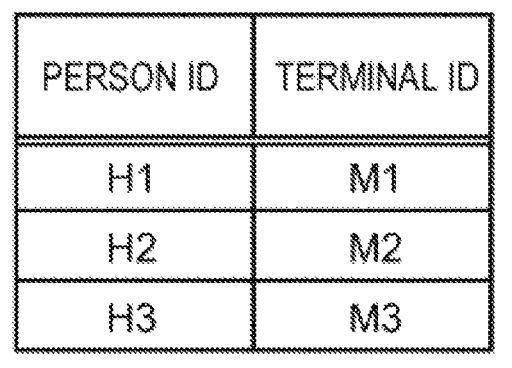

FIG. 7 illustrates an example of a linkage table generated as a result of linking. In this example, the linkage table has a record corresponding to a set of the person ID and the terminal ID. The record of the linkage table has a field in which the person ID is stored and a field in which the terminal ID is stored. It is indicated that the person ID and the terminal ID stored in the same record are linked with each other. FIG. 7 illustrates an example where the pattern likelihood:R1 for pattern ID:P1 is the maximum and exceeds the threshold value.

The likelihood of the combination of the person ID and the terminal ID illustrated in FIG. 6 is calculated based on the event related to the person 101 and the event related to the terminal 103 that occur at the same time.

Figure 8:
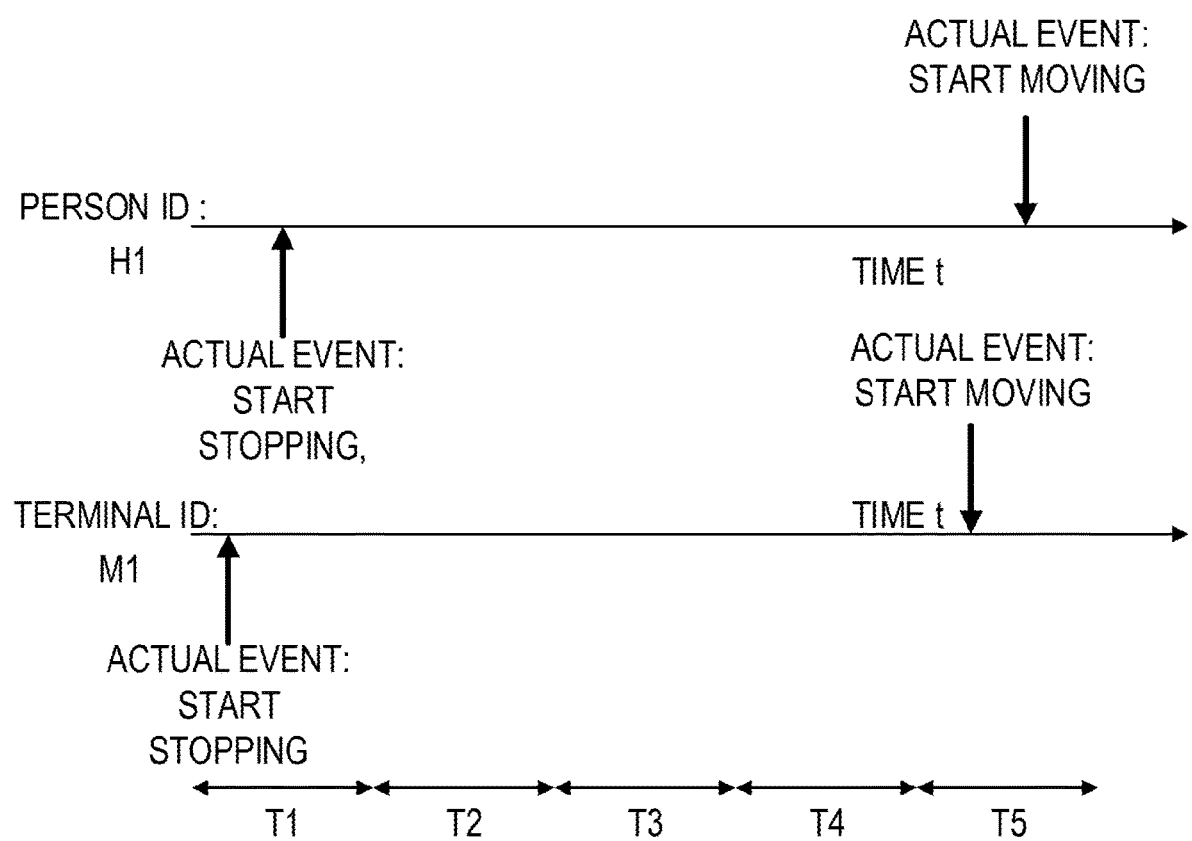
FIG. 8 is a diagram illustrating the generation timing of an actual event.

FIG. 8 illustrates the generation timing of the actual event. In this example, it is assumed that the person 101 specified by the person ID:H1 holds the terminal 103 specified by the terminal ID:M1. When the person 101 has been stopped, that is, when the state has shifted from the moving state to the stopped state, the monitoring apparatus 205 detects an event of "start stopping" including the person ID:H1 and an event of "start stopping" including the terminal ID:M1 at the close timing. When this event occurs, the likelihood associated with a combination of the person ID:H1 and the terminal ID:M1 is caused to increase.

Further, when the person 101 starts to walk, that is, when the state has shifted from the stopped state to the moving state, the monitoring apparatus 205 receives an event of "start moving" including the person ID:H1 and an event of "start moving" including the terminal ID:M1 at the close timing. When this event occurs, the likelihood associated with the combination of the person ID:H1 and the terminal ID:M1 is caused to increase.

In this example, the monitoring apparatus 205 continuously sets a plurality of periods having the same time length and updates the likelihood for a combination of the person ID and the terminal ID specified by the set of events generated within the same period based on the set. In the example illustrated in FIG. 8, the likelihood associated with the combination of the person ID:H1 and the terminal ID:M1 is updated at the time when a period T1 has elapsed. Thereafter, at the time when a period T5 has elapsed, the corresponding likelihood is updated. When the likelihood is updated only for the timing in which the actual event occurs, the likelihood of the combination is not updated in the period during which the actual event does not occur (in this example, T2 to T4).

As described above, the linking is also renewed at the timing at which the likelihood for one of the combinations is updated. Thus, in the example illustrated in FIG. 8, an opportunity to update the linking is likely to become sparse. As a result, there is a problem that the timing of linking is easily delayed.

Further, the likelihood of each combination is stored in a combination likelihood table held by the monitoring apparatus 205. FIG. 9 illustrates an example of a combination likelihood table. In this example, the combination likelihood table has a record corresponding to the person ID. The record of the combination likelihood table has a field in which the likelihood of the combination with the terminal M1 is stored, a field in which the likelihood of the combination with the terminal M2 is stored, and a field in which the likelihood of the combination with the terminal M3 is stored.

The likelihood associated with each combination stored in the combination likelihood table is calculated based on the stopped state score and the moving state score in the combination.

The stopped state score is a value indicating a relation with the stopped state of the terminal 103 in the same manner as the stopped state of the person 101 related to the combination. That is, when the stopped state score is large, it means that the degree of synchronization between the stopped state of the person 101 and the stopped state of the terminal 103 is high. The stopped state score in each combination is stored in the first score table held by the monitoring apparatus 205.

FIG. 10 illustrates an example of the first score table. In this example, the first score table has a record corresponding to the person ID. The record of the first score table has a field in which the stopped state score in combination with the terminal M1 is stored, a field in which the stopped state score in the combination of the terminal M2 is stored, and a field in which the stopped state score in combination with the terminal M3 is stored.

In the meantime, the moving state score is a value indicating a relationship between the moving state of the terminal 103 and the moving state of the person 101 related to the combination. That is, when the moving state score is large, it means that the degree of synchronization between the moving state of the person 101 and the moving state of the terminal 103 is high. The moving state score in each combination is stored in the second score table held by the monitoring apparatus 205.

FIG. 11 illustrates an example of a second score table. In this example, the second score table has a record corresponding to the person ID. The record of the second score table has a field in which the moving state score in combination with the terminal M1 is stored, a field in which the moving state score in the combination of the terminal M2 is stored, and a field in which the moving state score in combination with the terminal M3 is stored.

The likelihood associated with the combination described above, and a method of calculating the stopped state score and the moving state score in the combination will be described in detail later.

Figure 12:
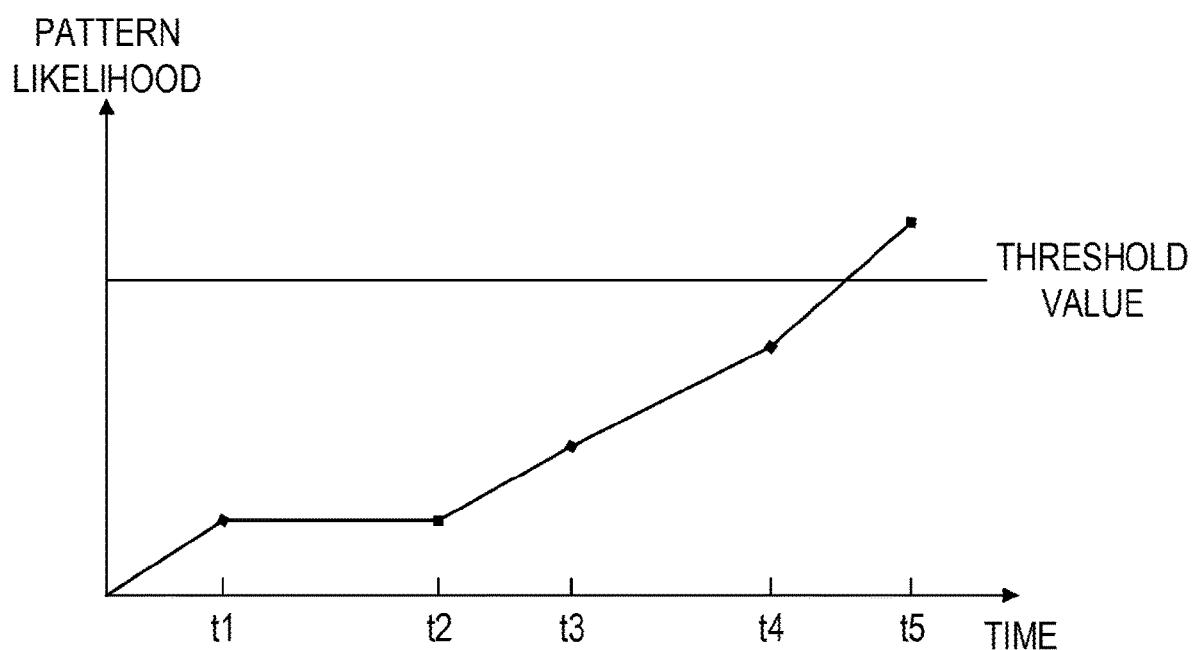
FIG. 12 is a diagram illustrating an example of change in pattern likelihood.

Here, the change in pattern likelihood is explained. FIG. 12 illustrates an example of change in pattern likelihood. In FIG. 12, $t_1$ to $t_5$ indicate the timing at which the pattern likelihood is updated. As illustrated in FIG. 12, the pattern likelihood increases stepwise, and exceeds the threshold value as a result of accumulation. Therefore, when updating the likelihood of the combination is not repeated to a certain degree, the linking is not performed.

However, as illustrated in FIG. 8, the frequency of updating related to the likelihood of the combination is low, based only on the actual events of "start stopping" and "start moving." Therefore, it takes time to obtain the result of the linking.

Figure 13:
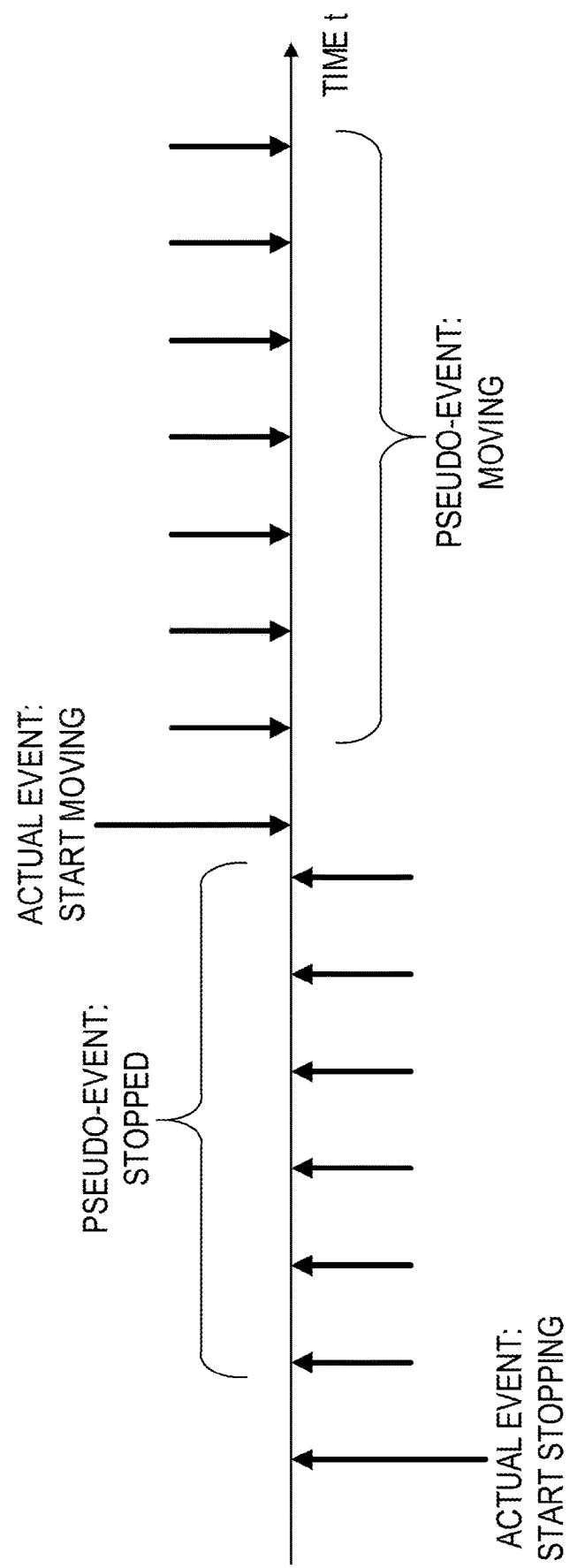
FIG. 13 is a diagram illustrating the generation timing of a pseudo-event.

In the present embodiment, as illustrated in FIG. 13, the monitoring apparatus 205 generates a pseudo-event. When the actual event of "start stopping" is received, the monitoring apparatus 205 internally generates a pseudo-event of "stopped" at regular intervals thereafter. In addition, when the actual event of "start moving" is received, the monitoring apparatus 205 internally generates a pseudo-event of "moving" at regular intervals thereafter.

This increases the frequency of occurrence of events so as to increase the chance of calculating the likelihood for each combination. As a result, the accumulative rate of increase in pattern likelihood increases. Thus, the results of the linking may be obtained at a relatively early stage. This concludes the summary of the present embodiment.

Figure 14:
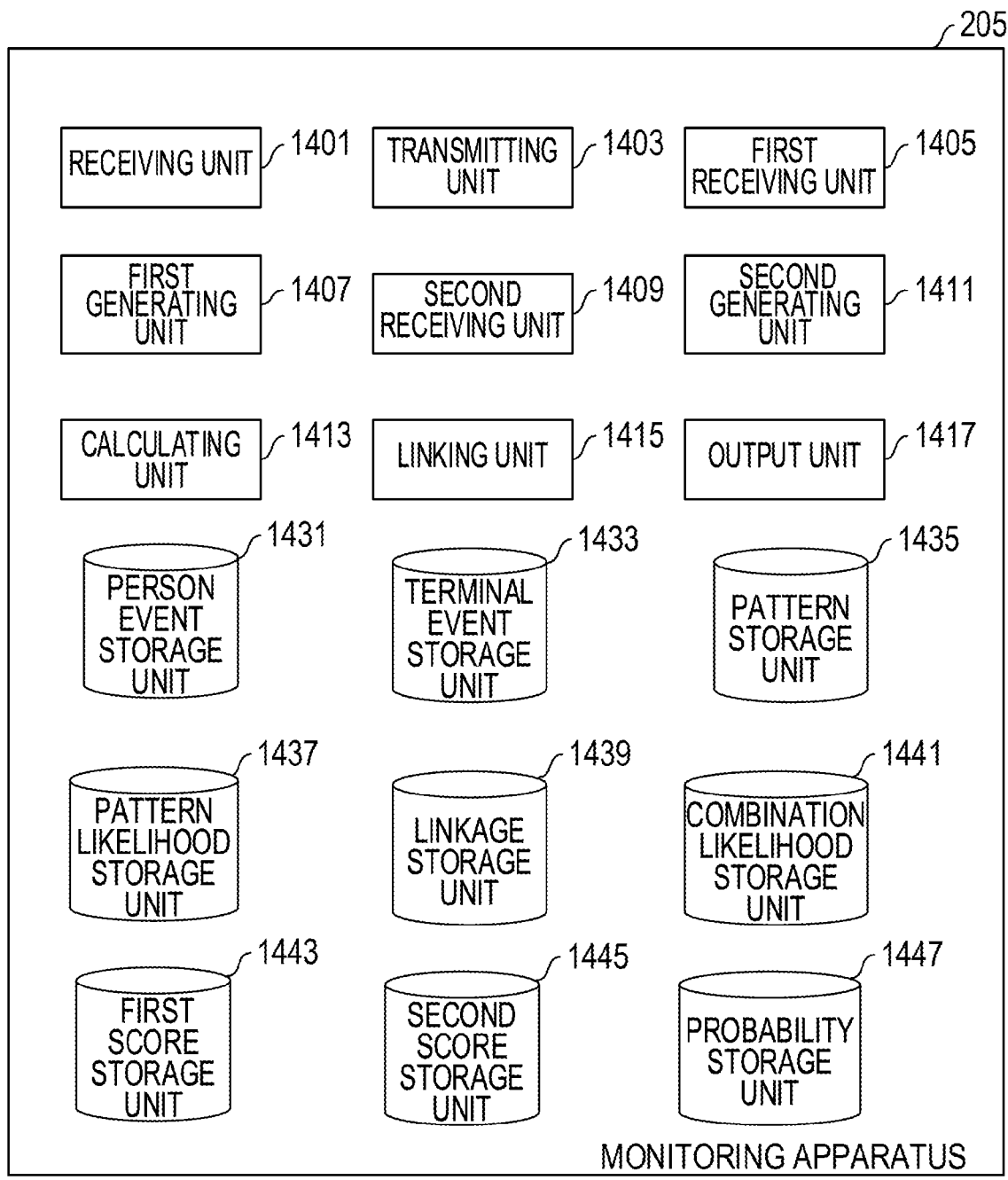
FIG. 14 is a diagram illustrating a module configuration example of a monitoring apparatus.

Hereinafter, the operation of the monitoring apparatus 205 will be described. FIG. 14 illustrates a module configuration example of the monitoring apparatus 205. The monitoring apparatus 205 includes a receiving unit 1401, a transmitting unit 1403, a first receiving unit 1405, a first generating unit 1407, a second receiving unit 1409, a second generating unit 1411, a calculating unit 1413, a linking unit 1415, and an output unit 1417.

The receiving unit 1401 receives actual events from the person event device 201 and the terminal event device 203. The transmitting unit 1403 transmits a linkage table to the person event device 201, the terminal event device 203, or another server device. The first receiving unit 1405 receives the actual event related to the person 101. The first generating unit 1407 generates a pseudo-event related to the person 101. The second receiving unit 1409 receives the actual event related to the terminal 103. The second generating unit 1411 generates a pseudo-event related to the terminal 103. The calculating unit 1413 periodically performs a combination likelihood calculation processing. The combination likelihood calculation processing will be described later with reference to FIG. 19. The linking unit 1415 performs a linking processing. The linking processing will be described later with reference to FIG. 34. The output unit 1417 outputs a linkage table.

The monitoring apparatus 205 further includes a person event storage unit 1431, a terminal event storage unit 1433, a pattern storage unit 1435, a pattern likelihood storage unit 1437, a linkage storage unit 1439, a combination likelihood storage unit 1441, a first score storage unit 1443, a second score storage unit 1445, and a probability storage unit 1447.

The person event storage unit 1431 stores the person event table described with reference to FIG. 3. The terminal event storage unit 1433 stores the terminal event table described with reference to FIG. 4. The pattern storage unit 1435 stores the pattern table described with reference to FIG. 5. The pattern likelihood storage unit 1437 stores the pattern likelihood table described with reference to FIG. 6. The linkage storage unit 1439 stores the linkage table described with reference to FIG. 7. The combination likelihood storage unit 1441 stores the combination likelihood table described with reference to FIG. 9. The first score storage unit 1443 stores the first score table described with reference to FIG. 10. The second score storage unit 1445 stores the second score table described with reference to FIG. 11. The probability storage unit 1447 stores a basic probability table and a first probability table to an eighth probability table. The basic probability table and the first probability table to the eighth probability table will be described later.

The receiving unit 1401, the transmitting unit 1403, the first receiving unit 1405, the first generating unit 1407, the second receiving unit 1409, the second generating unit 1411, the calculating unit 1413, the linking unit 1415, and the output unit 1417 (e.g., FIG. 42) as described above are implemented using a program that causes a processor to execute the processes described below.

Figure 42:
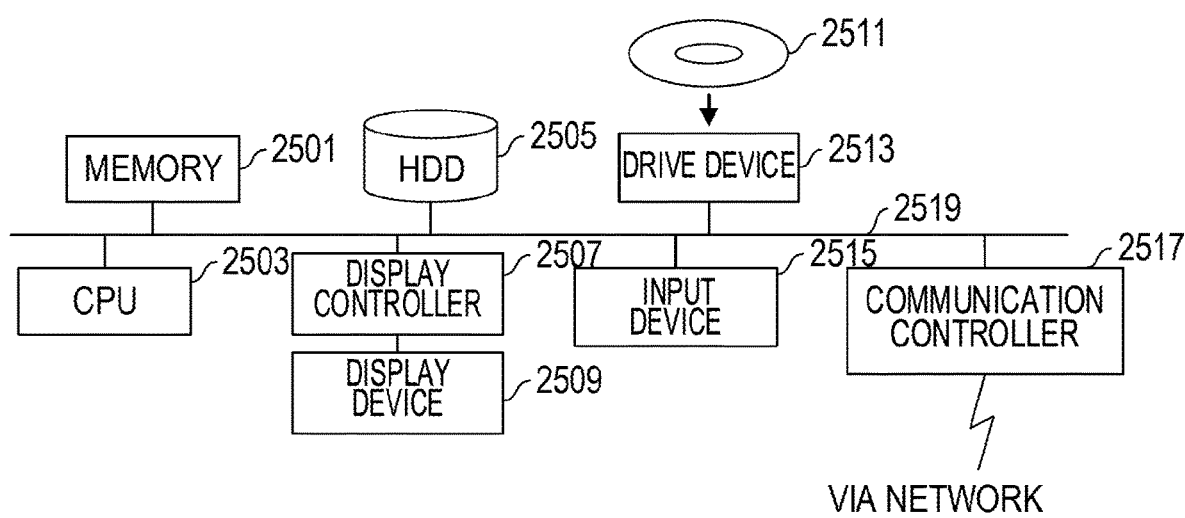
FIG. 42 is a functional block diagram of a computer.

The person event storage unit 1431, the terminal event storage unit 1433, the pattern storage unit 1435, the pattern likelihood storage unit 1437, the linkage storage unit 1439, the combination likelihood storage unit 1441, the first score storage unit 1443, the second score storage unit 1445, and the probability storage unit 1447 as described above are implemented using hardware resources (e.g., FIG. 42).

The processing in the monitoring apparatus 205 will be described. First, a first routine processing will be explained. The first routine processing is a processing for storing an event related to the person 101 and an event related to the terminal 103. The first routine processing is executed in parallel with the person event processing (to be described later), the concurrent terminal event processing, and the second routine processing.

Figure 15:
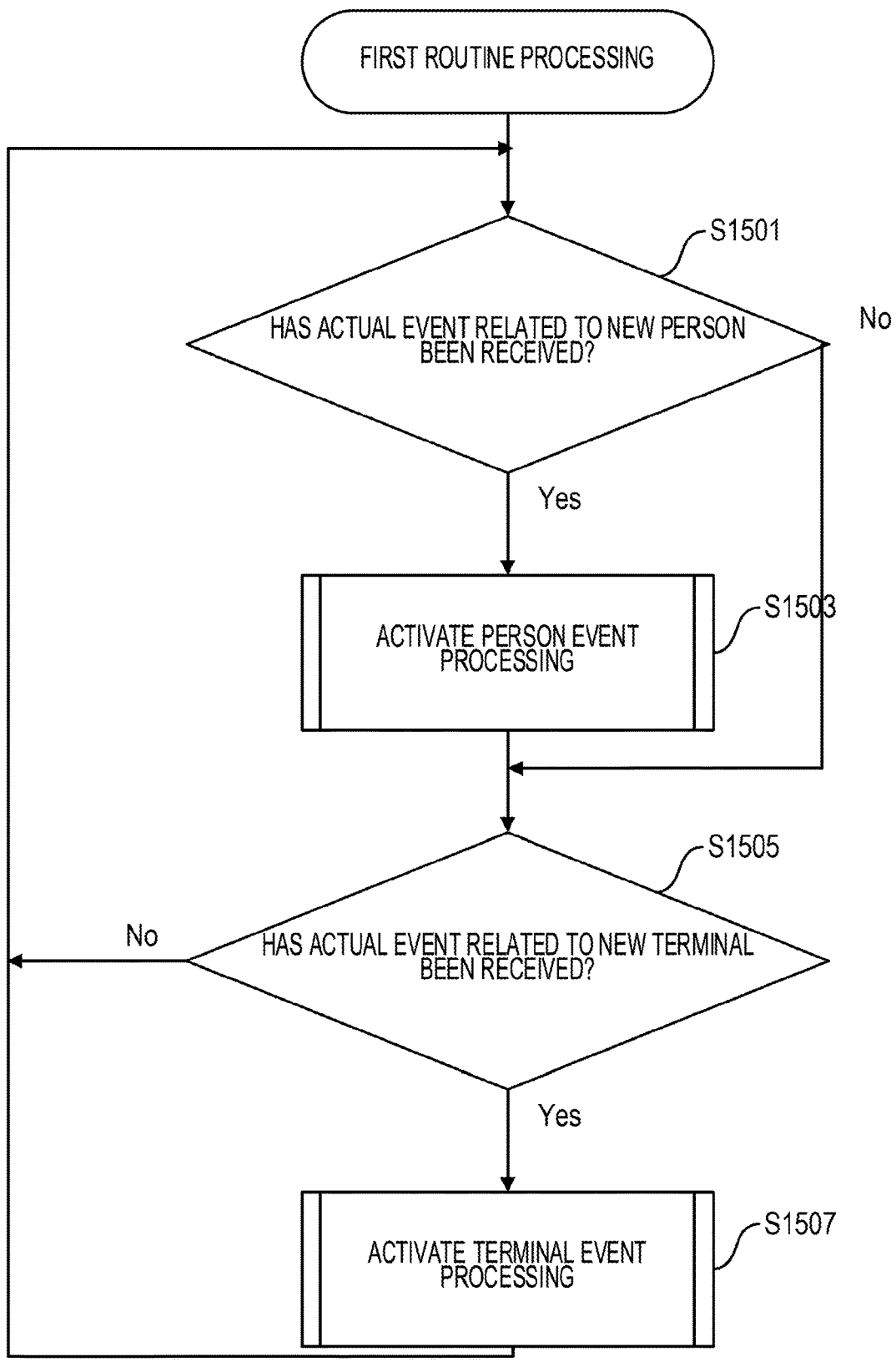
FIG. 15 is a diagram illustrating a first routine processing flow.

FIG. 15 illustrates a first routine processing flow. The first receiving unit 1405 determines whether the receiving unit 1401 has received the actual event related to the new person 101 (S1501). When an unknown person ID is added to the actual event related to the person 101, the first receiving unit 1405 determines that it is the actual event related to the new person 101.

When it is determined that the actual event related to the new person 101 has not been received, the processing proceeds to the processing illustrated in S1505. In the meantime, when it is determined that the actual event related to the new person 101 has been received, the first receiving unit 1405 activates the person event processing (S1503). The person event processing processes the event related to the person ID. The person event processing is executed in parallel with the first routine processing, the second routine processing (to be described later), the person event processing related to other person IDs, and the terminal event processing. Therefore, after activating the person event processing, the processing proceeds to S1505 without waiting for the end of the person event processing.

Figure 16:
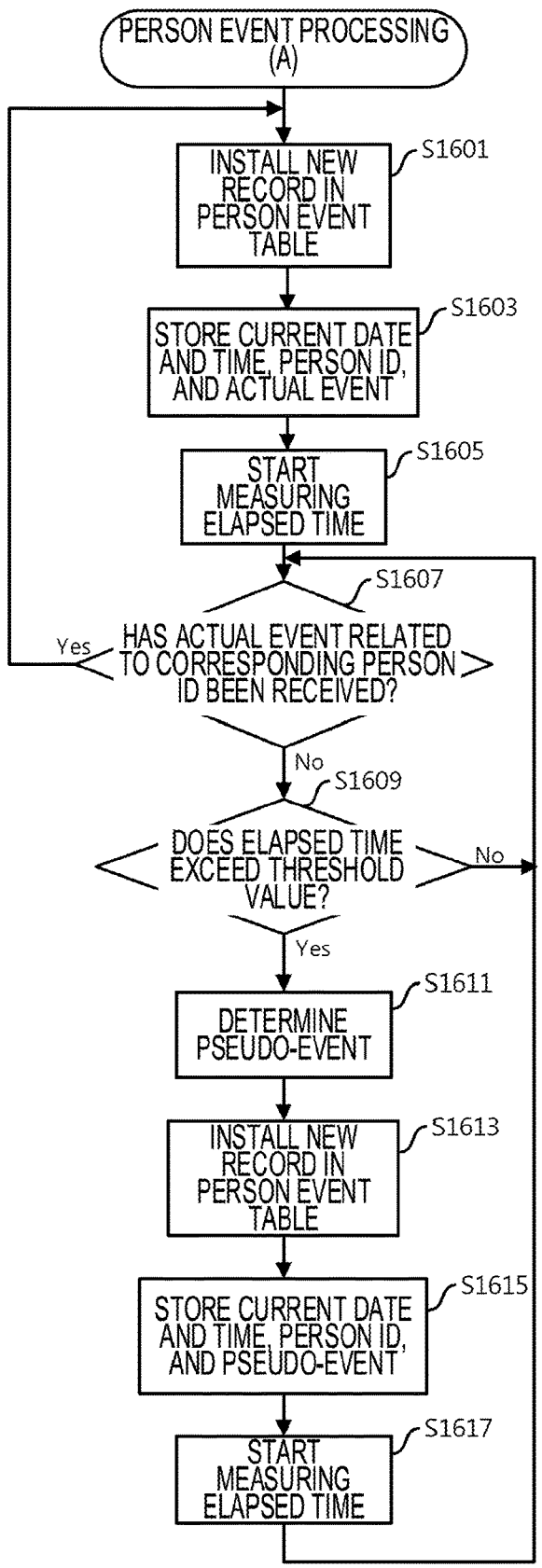
FIG. 16 is a diagram illustrating a person event processing (A) flow.

FIG. 16 illustrates the person event processing (A) flow. The first receiving unit 1405 installs a new record in the person event table (S1601). The first receiving unit 1405 stores the current date and time, the person ID, and the actual event in the new record (S1603).

The first generating unit 1407 starts measuring the elapsed time (S1605). The elapsed time is used to specify the timing for generating the pseudo-event. When the elapsed time has already been measured, the elapsed time measurement is restarted.

The first receiving unit 1405 determines whether the receiving unit 1401 has received the actual event related to the person ID (S1607). When it is determined that the actual event related to the person ID has been received, the processing returns to S1601 and the above-described processing is repeated.

In the meantime, when it is determined that the actual event related to the person ID has not been received, the first generating unit 1407 determines whether the elapsed time exceeds the threshold value (S1609). The threshold value corresponds to an interval at which the pseudo-event occurs. When it is determined that the elapsed time does not exceed the threshold value, the processing returns to S1607 and the above-described processing is repeated.

In the meantime, when it is determined that the elapsed time exceeds the threshold value, the first generating unit 1407 determines the pseudo-event in accordance with the recent actual event (S1611). When the recent actual event is "start moving," the pseudo-event is "moving." When the recent actual event is "start stopping," the pseudo-event is "stopped."

The first generating unit 1407 installs a new record in the person event table (S1613). Then, the first generating unit 1407 stores the current date and time, the person ID, and the pseudo-event (S1615).

The first generating unit 1407 starts measuring the elapsed time (S1617). When the elapsed time has already been measured, the elapsed time measurement is restarted. Then, the processing returns to the processing illustrated in S1607 and the above-described processing is repeated.

The description of FIG. 15 is referred to again. The second receiving unit 1409 determines whether the receiving unit 1401 has received the actual event related to the new terminal 103 (S1505). When an unknown terminal ID is added to the actual event related to the terminal 103, the second receiving unit 1409 determines that it is the actual event related to the new terminal 103.

When it is determined that the actual event related to the new terminal 103 has not been received, the processing returns to S1501 and the above-described processing is repeated. In the meantime, when it is determined that the real event related to the new terminal 103 has been received, the second receiving unit 1409 activates the terminal event processing (S1507). The terminal event processing is executed in parallel with the first routine processing, the second routine processing (to be described later), the person event processing, and the terminal event processing related to other terminal IDs. Therefore, after activating the terminal event processing, the processing returns to the processing illustrated in S1501 without waiting for the end of the terminal event processing, and the above-described processing is repeated.

Figure 17:
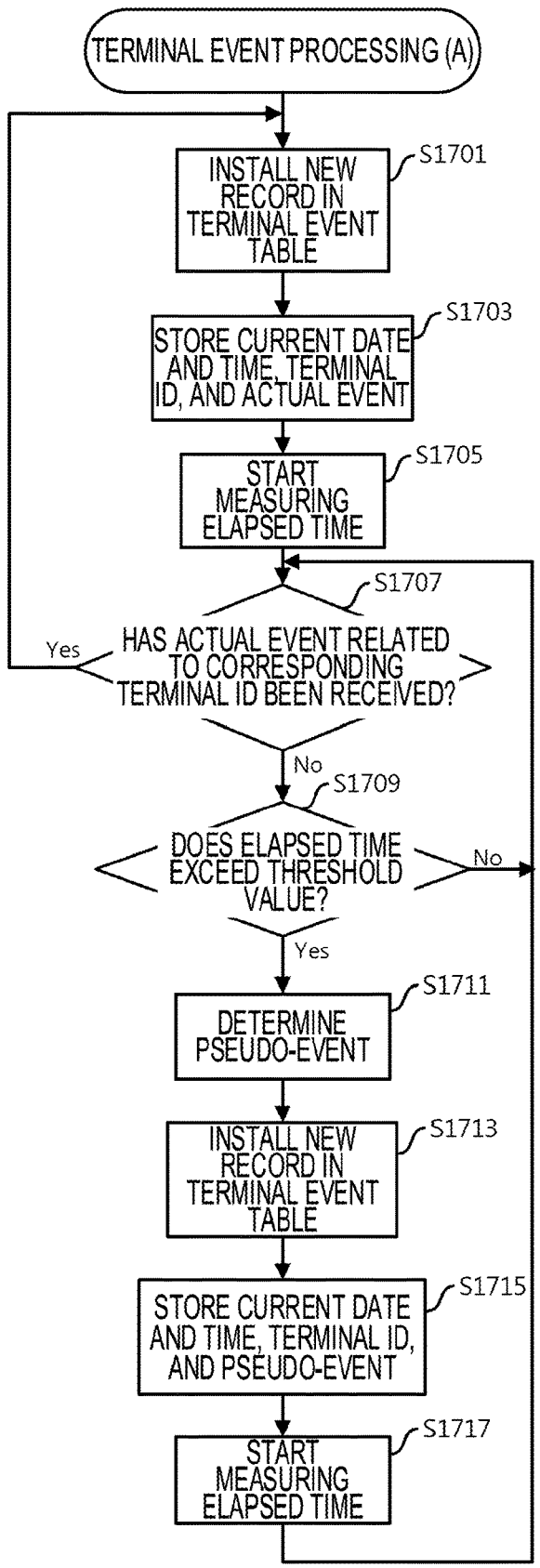
FIG. 17 is a diagram illustrating a terminal event processing (A) flow.

FIG. 17 illustrates the terminal event processing (A) flow. The second receiving unit 1409 installs a new record in the terminal event table (S1701). The second receiving unit 1409 stores the current date and time, the terminal ID, and the actual event (S1703).

The second generating unit 1411 starts measuring the elapsed time (S1705). The elapsed time is used to specify the timing for generating the pseudo-event. When the elapsed time has already been measured, the elapsed time measurement is restarted.

Further, the second receiving unit 1409 determines whether the receiving unit 1401 has received the actual event related to the terminal ID (S1707). When it is determined that the actual event related to the terminal ID has been received, the processing returns to the processing illustrated in S1701 and the above-described processing is repeated.

In the meantime, when it is determined that the actual event related to the terminal ID has not been received, the second generating unit 1411 determines whether the elapsed time exceeds the threshold value (S1709). The threshold value corresponds to an interval at which the pseudo-event is generated. When it is determined that the elapsed time does not exceed the threshold value, the processing returns to S1707 and the above-described processing is repeated.

In the meantime, when it is determined that the elapsed time exceeds the threshold value, the second generating unit 1411 determines the pseudo-event (S1711). As described above, when the recent actual event is "start moving," the pseudo-event is "moving." Similarly, when the recent actual event is "start stopping," the pseudo-event is "stopped."

The second generating unit 1411 installs a new record in the terminal event table (S1713). Further, the second generating unit 1411 stores the current date and time, the terminal ID, and the pseudo-event (S1715).

The second generating unit 1411 starts measuring the elapsed time (S1717). When the elapsed time has already been measured, the elapsed time measurement is restarted. Then, the processing returns to the processing illustrated in S1717 and the above-described processing is repeated. This concludes the description of the first routine processing and the processing related thereto.

Subsequently, the second routine processing will be explained. In the second routine processing, the pattern likelihood is periodically calculated and linked. The second routine processing is executed in parallel with the first routine processing, the person event processing, and the terminal event processing.

Figure 18:
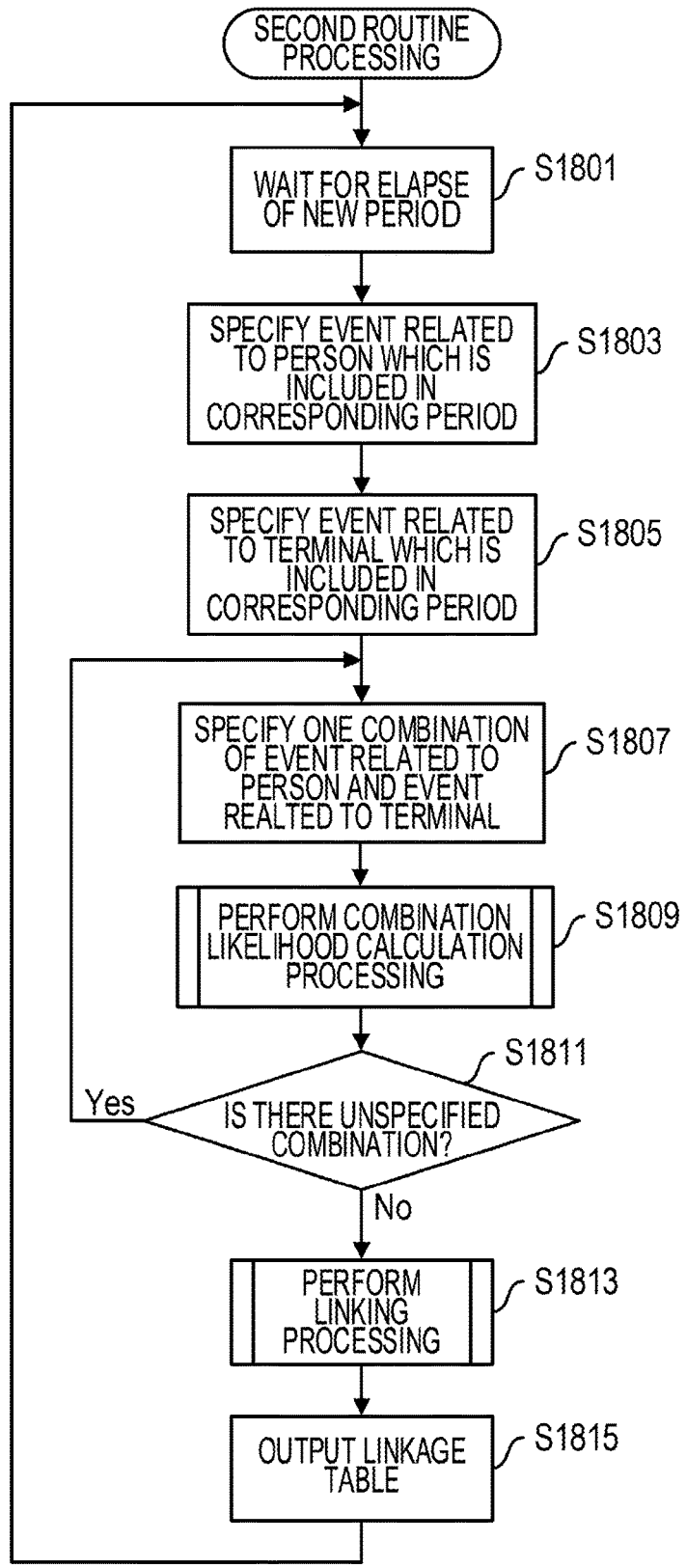
FIG. 18 is a diagram illustrating a second routine processing flow.

FIG. 18 illustrates a second routine processing flow. The calculating unit 1413 waits for the elapse of a new period (S1801). The period is a period of a predetermined length. When the end of the new period is reached, the calculating unit 1413 specifies an event related to the person 101 included in the period (S1803). In addition, the calculating unit 1413 specifies an event related to the terminal 103 included in the period (S1805).

The calculating unit 1413 specifies one combination of the event related to the person 101 specified in S1803 and the event related to the terminal 103 specified in S1805 (S1807). The calculating unit 1413 executes a combination likelihood calculation processing based on the combination of the events (S1809). In the combination likelihood calculation processing, the calculating unit 1413 calculates the likelihood of the combination of the person ID and the terminal ID.

Figure 19:
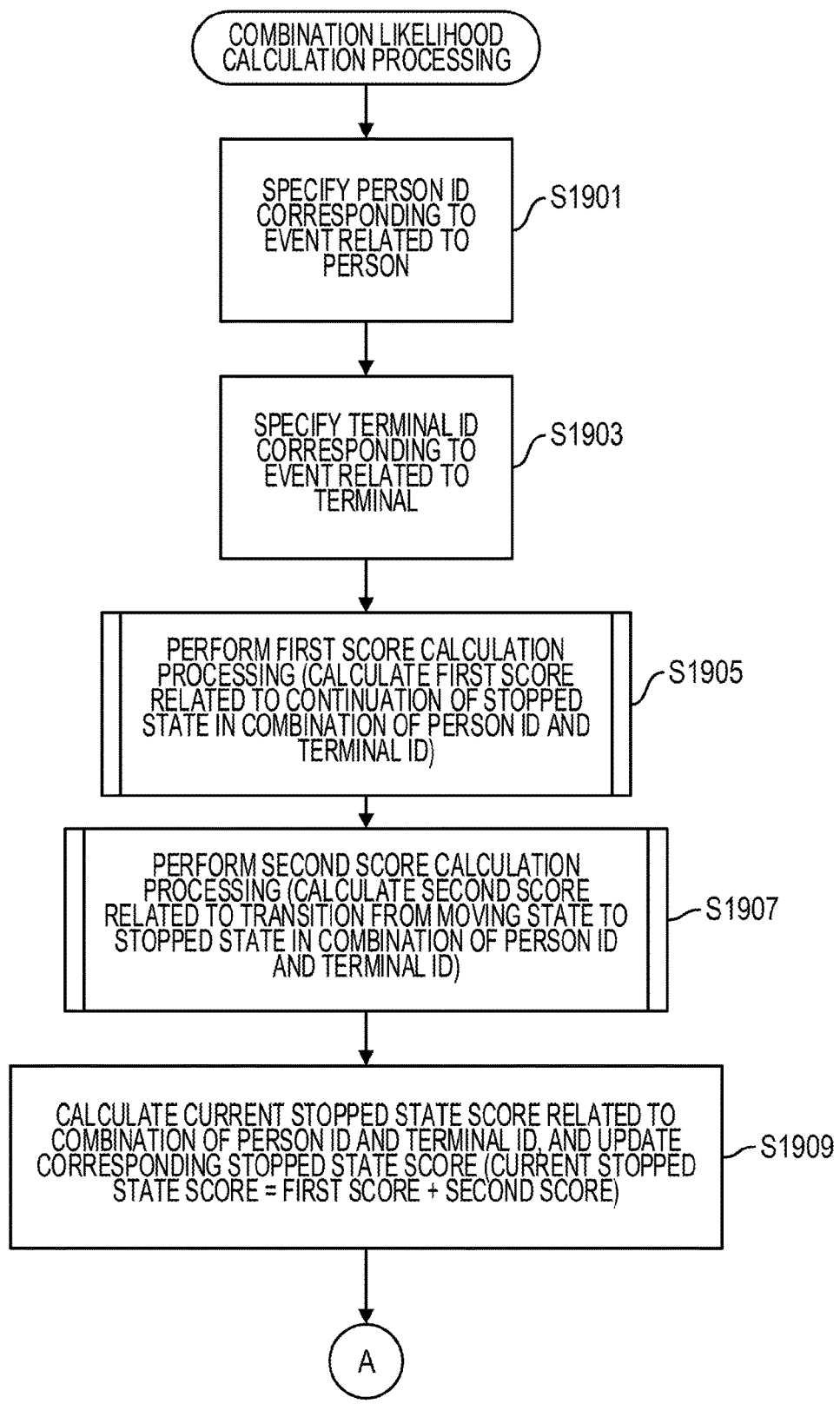
FIG. 19 is a diagram illustrating a combination likelihood calculation processing flow.

FIG. 19 illustrates the combination likelihood calculation processing flow. The calculating unit 1413 specifies the person ID corresponding to the event related to the person 101 with the record of the person event table (S1901). The calculating unit 1413 specifies the terminal ID corresponding to the event related to the terminal 103 with the record of the terminal event table (S1903).

The calculating unit 1413 executes a first score calculation processing (S1905). The calculating unit 1413 calculates a first score related to the continuation of the stopped state in the combination of the person ID and the terminal ID in the first score calculation processing. The first score is a value indicating the probability that the person 101 of the person ID and the terminal 103 of the terminal ID will continue to be stopped at the same timing.

Figure 20:
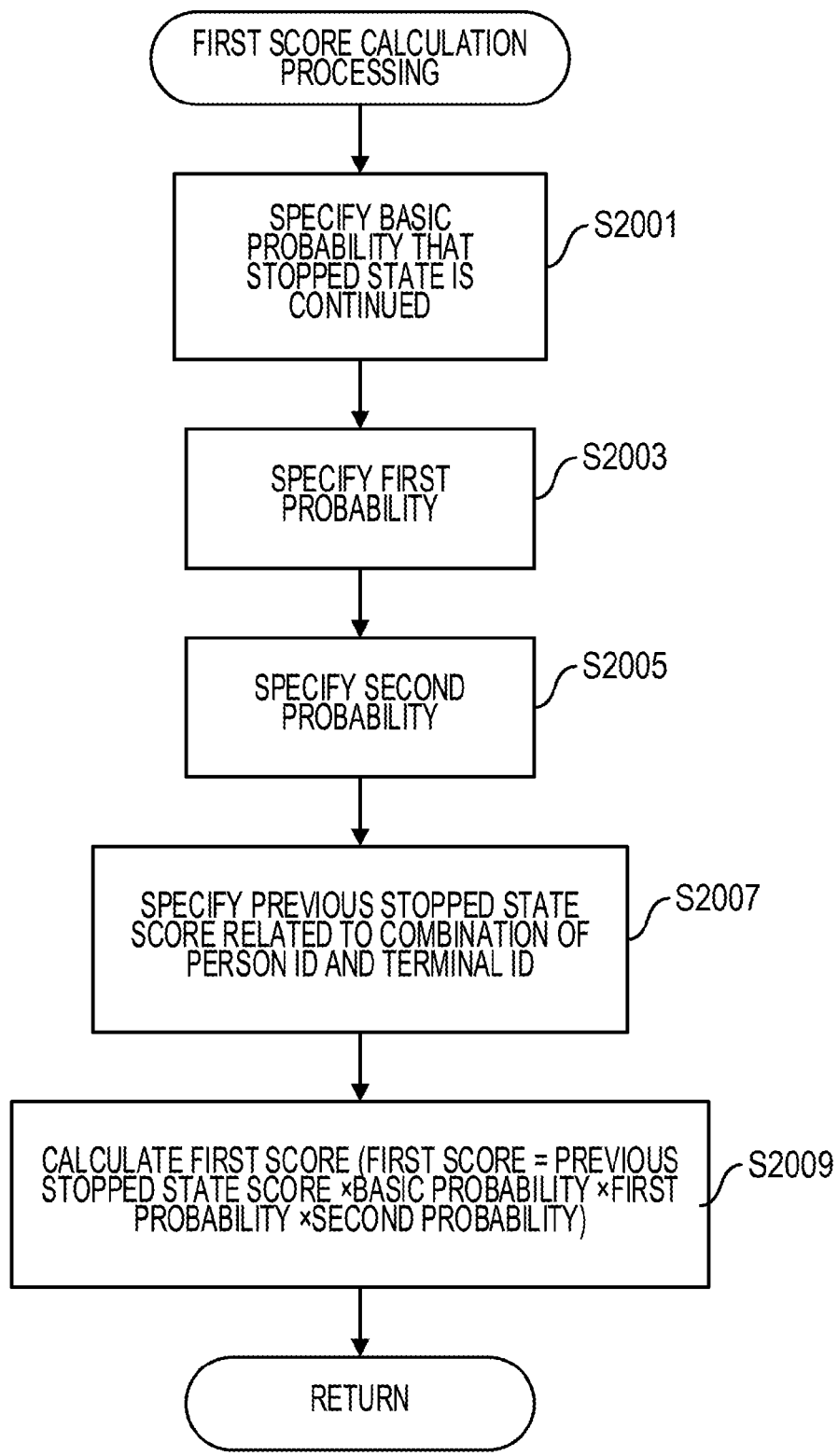
FIG. 20 is a diagram illustrating a first score calculation processing flow.

FIG. 20 illustrates a first score calculation processing flow. Based on the basic probability table, the calculating unit 1413 specifies a basic probability that the stopped state is continued (S2001). The basic probability is a probability of state transition, which is determined based on the behavior trend of a person.

FIG. 21 illustrates an example of the basic probability table. In this example, the basic probability table has a record corresponding to the previous state. The previous state is a stopped state or a moving state. The record of the basic probability table has a field in which the basic probability that the current state is a stopped state is stored and a field in which the basic probability in which the current state is a moving state is stored.

This example indicates that, when the person 101 is in the stopped state at the time of the previous determination, the probability that the person 101 is in the stopped state again at the time of the current determination, that is, the probability of continuing the stopped state is 0.5. This example also indicates that the probability that the person 101 shifts to the moving state at the time of the current determination is 0.5 when the person 101 is in the stopped state at the time of the previous determination. In addition, this example indicates that, when the person 101 is in a moving state at the time of the previous determination, the probability that the person 101 shifts to the stopped state at the time of the current determination is 0.5. Further, when the person 101 is in a moving state at the time of the previous determination, the probability that the person 101 is in the stopped state again at the current determination time, that is, the probability of continuing the moving state is 0.5.

The value of the basic probability is determined in advance, for example, according to the place where a monitoring system is applied and the characteristics of a person.

The description of FIG. 20 is referred to again. Based on the first probability table, the calculating unit 1413 specifies a first probability that the event related to the person 101 occurs when the stopped state is continued (S2003).

FIG. 22 illustrates an example of the first probability table. In this example, the first probability table has a record corresponding to the event related to the person 101. The event related to the person 101 is one of "stopped," "moving," "start stopping," and "start moving."

The record of the first probability table has a field in which the first probability of occurrence of the event related to the person 101 is stored when the stopped state is continued.

This example indicates that the probability of occurrence of "stopped" as an event related to the person 101 is 0.97 when the stopped state is continued. This example also indicates that the probability of occurrence of "moving" as an event related to the person 101 is 0.01 when the stopped state is continued. In addition, this example indicates that the probability of occurrence of "start stopping" as an event related to the person 101 is 0.01 when the stopped state is continued. Further, this example indicates that the probability of occurrence of "start moving" as an event related to the person 101 is 0.01 when the stopped state is continued.

The description of FIG. 20 is referred to again. Based on the second probability table, the calculating unit 1413 specifies the second probability that the event related to the terminal 103 occurs when the stopped state is continued (S2005).

FIG. 23 illustrates an example of the second probability table. The second probability table in this example has a record corresponding to the event related to the terminal 103. The event related to the terminal 103 is one of "stopped," "moving," "start stopping," and "start moving."

The record of the third probability table has a field in which the second probability that the event related to the terminal 103 occurs is stored when the stopped state is continued.

This example indicates that the probability of occurrence of "stopped" as an event related to the terminal 103 is 0.97 when the stopped state is continued. This example also indicates that the probability of occurrence of "moving" as an event related to the terminal 103 is 0.01 when the stopped state is continued. In addition, this example indicates that the probability of occurrence of "start stopping" as an event related to the terminal 103 is 0.01 when the stopped state is continued. Further, this example indicates that the probability of occurrence of "start moving" as an event related to the terminal 103 is 0.01 when the stopped state is continued.

The description of FIG. 20 is referred to again. The calculating unit 1413 specifies the previous stopped state score associated with the combination of the person ID and the terminal ID in the first score table (S2007). Further, the calculating unit 1413 calculates a first score (S2009). In this example, the first score is the product of the previous stopped state score, the basic probability, the first probability, and the second probability. The stopped state score is also updated in the first score table. When the first score calculation processing is completed, the processing returns to the combination likelihood calculation processing of a caller.

The description of FIG. 19 is referred to again. When the first score calculation processing is completed, the calculating unit 1413 executes the second score calculation processing (S1907). The calculating unit 1413 calculates a second score related to transition from the moving state to the stopped state in the combination of the person ID and the terminal ID in the second score calculation processing. The second score is a value indicating the probability that the person 101 of the person ID and the terminal 103 of the terminal ID transit from the moving state to the stopped state at the same timing.

Figure 24:
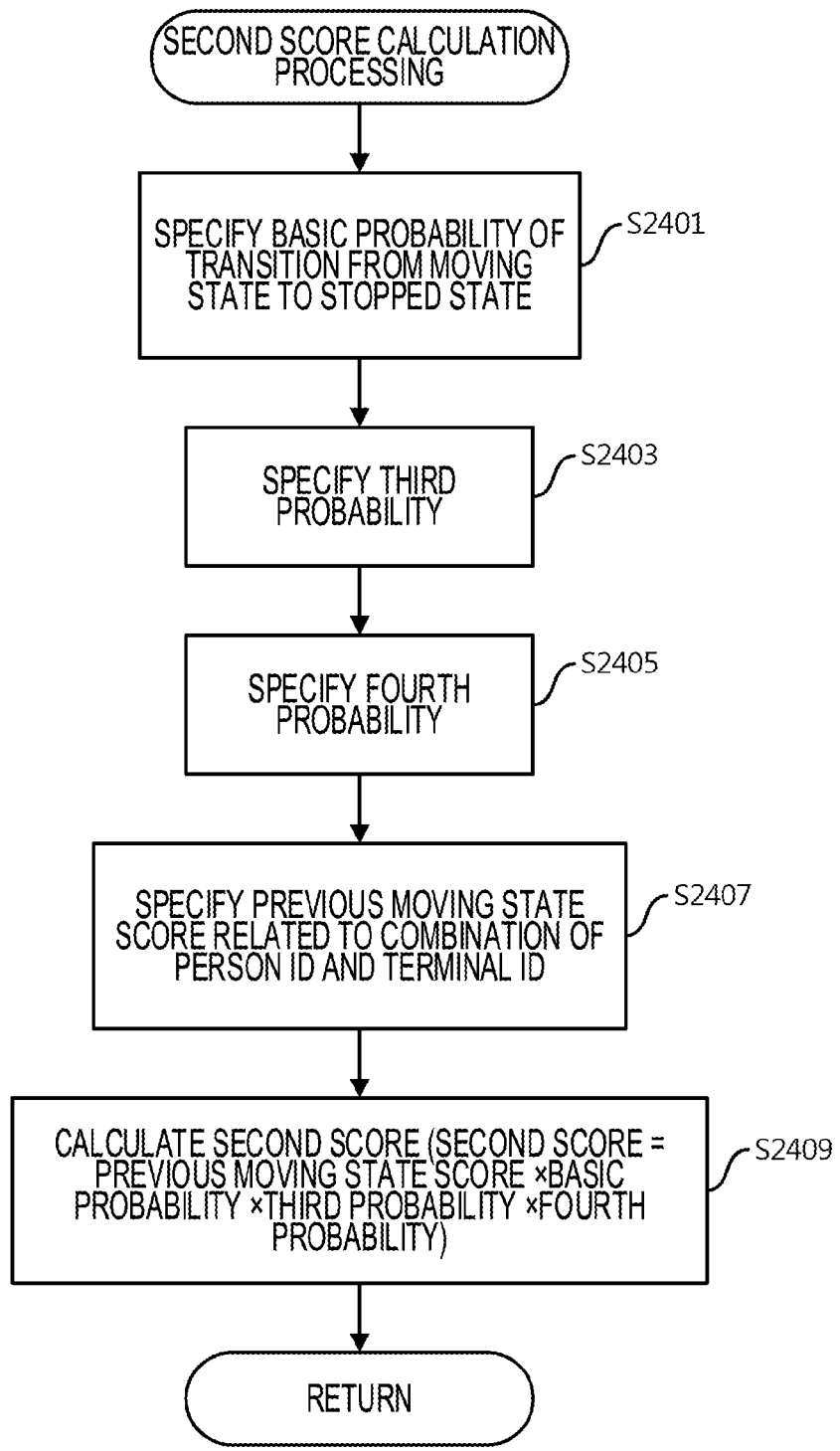
FIG. 24 is a diagram illustrating a second score calculation processing flow.

FIG. 24 illustrates the second score calculation processing flow. The calculating unit 1413 specifies a basic probability of transition from the moving state to the stopped state based on the basic probability table (S2401).

The calculating unit 1413 specifies a third probability that the event related to the person 101 occurs when a transition from the moving state to the stopped state is made based on the third probability table (S2403).

FIG. 25 illustrates an example of the third probability table. In this example, the third probability table has a record corresponding to the event related to the person 101.

The record of the third probability table has a field that stores a third probability that the event related to the person 101 occurs when the state transitions from the moving state to the stopped state.

This example indicates that the probability of occurrence of "stopped" as an event related to the person 101 is 0.1 when transitioning from the moving state to the stopped state. This example also indicates that the probability of occurrence of "moving" as an event related to the person 101 is 0.1 when transitioning from the moving state to the stopped state. In addition, this example indicates that the probability of occurrence of "start stopping" as an event related to the person 101 is 0.7 when transitioning from the moving state to the stopped state. Further, this example indicates that the probability of occurrence of "start moving" as an event related to the person 101 is 0.1 when transitioning from the moving state to the stopped state.

The description of FIG. 24 is referred to again. The calculating unit 1413 specifies a fourth probability that the event related to the terminal 103 occurs when a transition from the moving state to the stopped state is made based on the fourth probability table (S2405).

FIG. 26 illustrates an example of the fourth probability table. The fourth probability table in this example has a record corresponding to the event related to the terminal 103.

The record of the fourth probability table has a field that stores a fourth probability that the event related to the terminal 103 occurs when transitioning from the moving state to the stopped state.

This example indicates that the probability of occurrence of "stopped" as an event related to the terminal 103 is 0.1 when transitioning from the moving state to the stopped state. This example also indicates that the probability of occurrence of "moving" as an event related to the terminal 103 is 0.1 when transitioning from the moving state to the stopped state. In addition, this example indicates that the probability of occurrence of "start stopping" as an event related to the terminal 103 is 0.7 when transitioning from the moving state to the stopped state. Further, this example indicates that the probability of occurrence of "start moving" as an event related to the terminal 103 is 0.1 when transitioning from the moving state to the stopped state.

The description of FIG. 24 is referred to again. The calculating unit 1413 specifies the previous moving state score associated with the combination of the person ID and the terminal ID in the second score table (S2407).

The calculating unit 1413 calculates the second score (S2409). In this example, the second score is the product of the previous moving state score, the basic probability, the third probability, and the fourth probability. The moving state score is also updated in the second score table. When the second score calculation processing is completed, the processing returns to the combination likelihood calculation processing of a caller.

Figure 27:
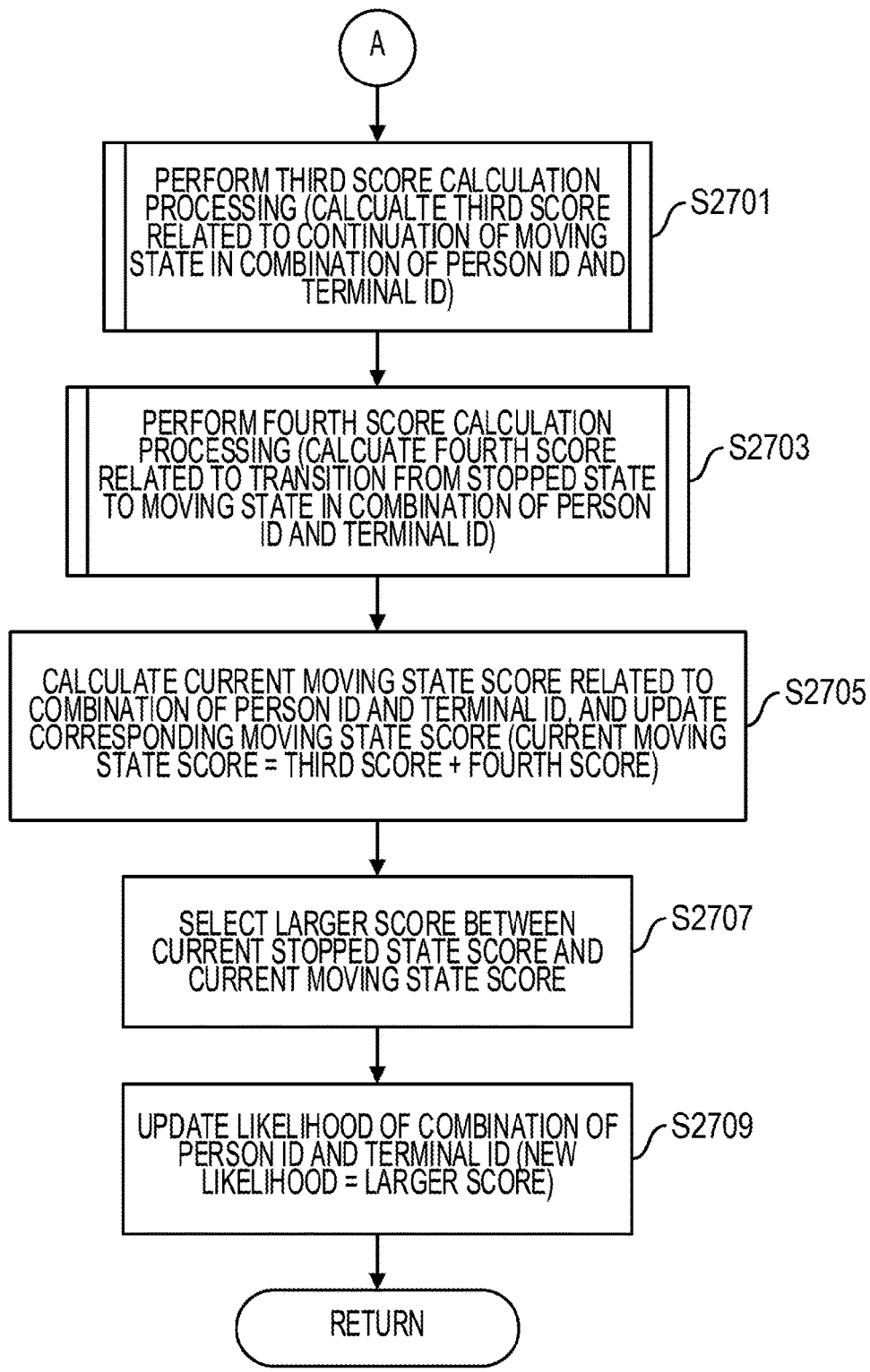
FIG. 27 is a diagram illustrating a combination likelihood calculation processing flow.

The description of FIG. 19 is referred to again. The calculating unit 1413 calculates the current stopped state score associated with the combination of the person ID and the terminal ID, and updates the corresponding stopped state score in the first score table (S1909). Further, in this example, the current stopped state scorecard is the sum of the first score and the second score. The processing proceeds to the processing of S2701 illustrated in FIG. 27 via a terminal A.

The description of FIG. 27 is referred to again. The calculating unit 1413 executes the third score calculation processing (S2701). The calculating unit 1413 calculates a third score related to the continuation of the moving state in the combination of the person ID and the terminal ID in the third score calculation processing. The third score is a value indicating the probability that the person 101 of the person ID and the terminal 103 of the terminal ID continue the moving state at the same timing.

Figure 28:
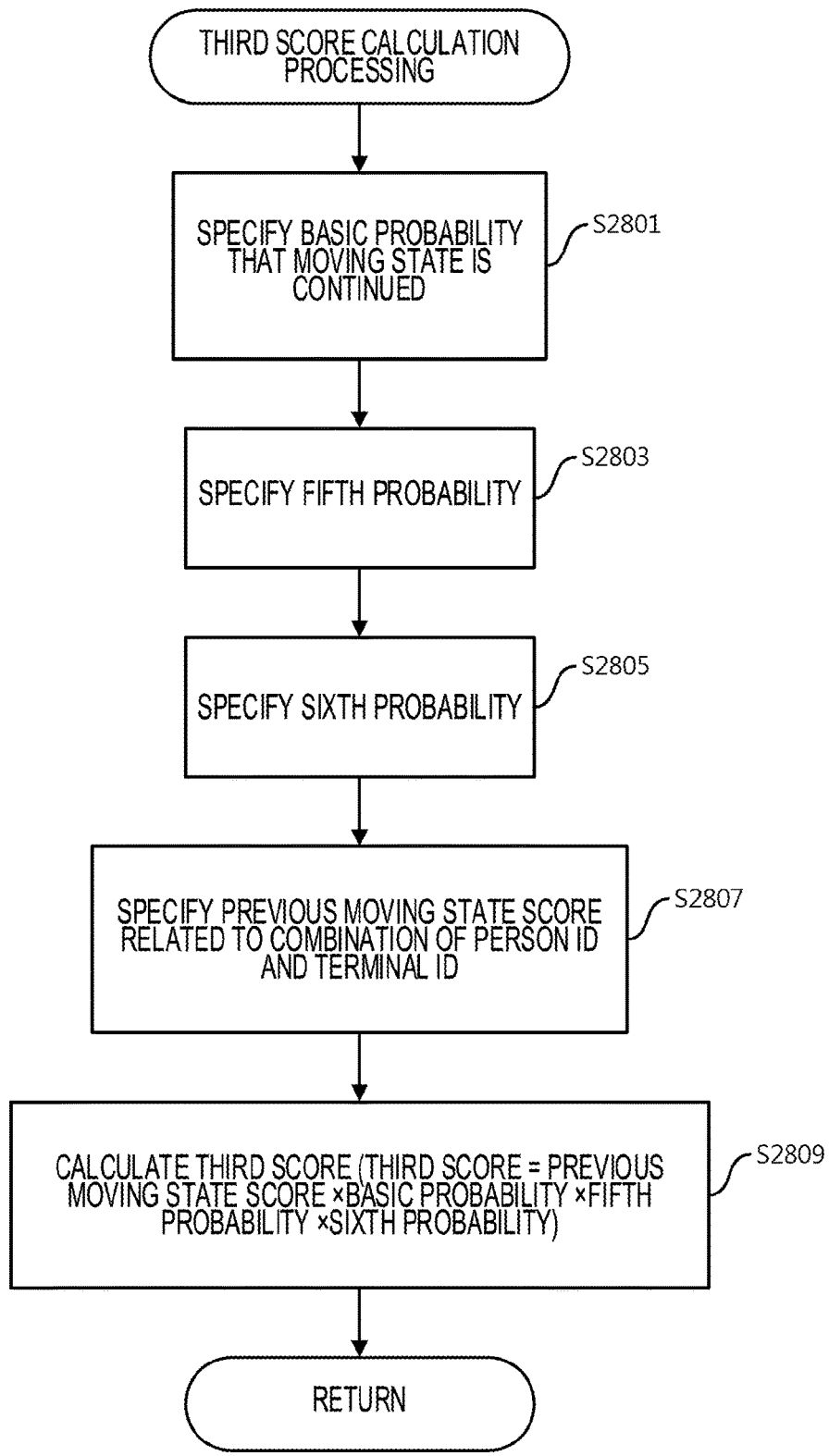
FIG. 28 is a diagram illustrating a third score calculation processing flow.

FIG. 28 illustrates the third score calculation processing flow. Based on the basic probability table, the calculating unit 1413 specifies the basic probability that the moving state is continued (S2801).

Based on a fifth probability table, the calculating unit 1413 specifies a fifth probability that the event related to the person 101 occurs when the moving state is continued (S2803).

FIG. 29 illustrates an example of the fifth probability table. In this example, the fifth probability table has a record corresponding to the event related to the person 101.

The record of the fifth probability table has a field that stores a fifth probability that the event related to the person 101 occurs when the moving state is continued.

This example indicates that the probability of occurrence of "stopped" as an event related to the person 101 is 0.01 when the moving state is continued. This example also indicates that the probability of occurrence of "moving" as an event related to the person 101 is 0.97 when the moving state is continued. In addition, this example indicates that the probability of occurrence of "starting moving" as an event related to the person 101 is 0.01 when the moving state is continued. Further, this example indicates that the probability of occurrence of "starting moving" as an event related to the person 101 is 0.01 when the moving state is continued.

The description of FIG. 28 is referred to again. Based on a sixth probability table, the calculating unit 1413 specifies a sixth probability that the event related to the terminal 103 occurs when the moving state is continued (S2805).

FIG. 30 illustrates an example of the sixth probability table. The sixth probability table in this example has a record corresponding to the event related to the terminal 103.

The record of the sixth probability table has a field that stores a sixth probability that the event related to the terminal 103 occurs when the moving state is continued.

This example indicates that the probability of occurrence of "stopped" as an event related to the terminal 103 is 0 when the moving state is continued. This example also indicates that the probability of occurrence of "moving" as an event related to the terminal 103 is 0.97 when the moving state is continued. In addition, this example indicates that the probability of occurrence of "start stopping" as an event related to the terminal 103 is 0.01 when the moving state is continued. Further, this example indicates that the probability of occurrence of "start moving" as an event related to the terminal 103 is 0.01 when the moving state is continued.

The description of FIG. 28 is referred to again. The calculating unit 1413 specifies the previous moving state score associated with the combination of the person ID and the terminal ID in the second score table (S2807). The calculating unit 1413 calculates a third score (S2809). In this example, the third score is the product of the previous moving state score, the basic probability, the fifth probability, and the sixth probability. The moving state score is also updated in the second score table. When the third score calculation processing is completed, the processing returns to the combination likelihood calculation processing of a caller.

The description of FIG. 27 is referred to again. When the third score calculation processing is completed, the calculating unit 1413 executes a fourth score calculation processing (S2703). The calculating unit 1413 calculates a fourth score related to a transition from the stopped state to the moving state in the combination of the person ID and the terminal ID in the fourth score calculation processing. The fourth score is a value indicating the probability that the person 101 of the person ID and the terminal 103 of the terminal ID transit from the stopped state to the moving state at the same timing.

Figure 31:
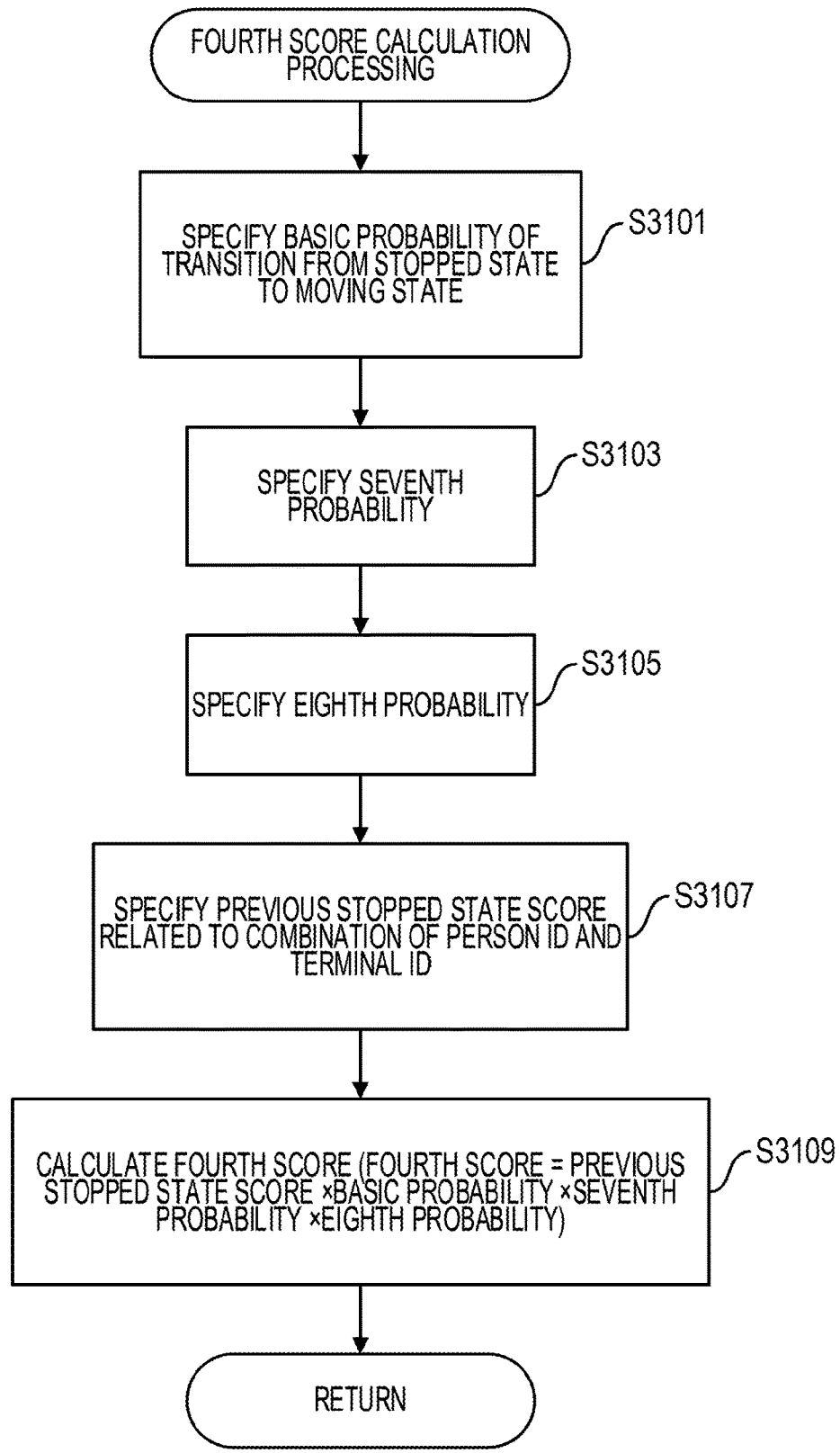
FIG. 31 is a diagram illustrating a fourth score calculation processing flow.

FIG. 31 illustrates the fourth score calculation processing flow. Based on the basic probability table, the calculating unit 1413 specifies a basic probability of transition from the stopped state to the moving state (S3101).

The calculating unit 1413 specifies a seventh probability that the event related to the person 101 occurs when a transition from the stopped state to the moving state is made based on the seventh probability table (S3103).

FIG. 32 illustrates an example of a seventh probability table. In this example, the seventh probability table has a record corresponding to the event related to the person 101.

The record of the seventh probability table has a field that stores a seventh probability that the event related to the person 101 occurs when transitioning from the stopped state to the moving state.

This example indicates that the probability of occurrence of "stopped" as an event related to the person 101 is 0.1 when transitioning from the stopped state to the moving state. This example also indicates that the probability of occurrence of "moving" as an event related to the person 101 is 0.1 when transitioning from the stopped state to the moving state. In addition, this example indicates that the probability of occurrence of "moving" as an event related to the person 101 is 0.1 when transitioning from the stopped state to the moving state. Further, this example indicates that the probability of occurrence of "start moving" as an event related to the person 101 is 0.1 when transitioning from the moving state to the stopped state The description of FIG. 31 is referred to again. The calculating unit 1413 specifies an eighth probability that the event related to the terminal 103 occurs when a transition from the stopped state to the moving state is made based on the eighth probability table (S3105).

FIG. 33 illustrates an example of an eighth probability table. In this example, the eighth probability table has a record corresponding to the event related to the terminal 103.

The record of the eighth probability table has a field that stores an eighth probability that the event related to the terminal 103 occurs when a transition from the stopped state to the moving state is made.

This example indicates that the probability of occurrence of "stopped" as an event related to the terminal 103 is 0.1 when transitioning from the stopped state to the moving state. This example also indicates that the probability of occurrence of "moving" as an event related to the terminal 103 is 0.1 when transitioning from the stopped state to the moving state. In addition, this example indicates that the probability of occurrence of "start stopping" as an event related to the terminal 103 is 0.1 when transitioning from the stopped state to the moving state. Further, this example indicates that the probability of occurrence of "start moving" as an event related to the terminal 103 is 0.7 when transitioning from the stopped state to the moving state.

The description of FIG. 31 is referred to again. The calculating unit 1413 specifies the previous stopped state score associated with the combination of the person ID and the terminal ID in the first score table (S3107). The calculating unit 1413 calculates a fourth score (S3109). In this example, the fourth score is the product of the previous stopped state score, the basic probability, the seventh probability, and the eighth probability. The stopped state score is also updated in the first score table. When the fourth score calculation processing is completed, the processing returns to the combination likelihood calculation processing of a caller.

The description of FIG. 27 is referred to again. The calculating unit 1413 calculates the current moving state score associated with the combination of the person ID and the terminal ID, and updates the corresponding moving state score in the second score table (S2705). In this example, the current moving state score is the sum of the third score and the fourth score.

The calculating unit 1413 selects the larger score between the current stopped state score and the current moving state score (S2707). The calculating unit 1413 updates the likelihood of the combination of the person ID and the terminal ID in the combination likelihood table (S2709). In this example, the new likelihood is the larger score selected in S2707. However, the sum of the current stopped state score and the current moving state score may be the likelihood of the combination. When the combination likelihood calculation processing is completed, the processing returns to the second routine processing of a caller.

The description of FIG. 18 is referred to again. Upon completion of the combination likelihood calculation processing, the calculating unit 1413 determines whether there is an unspecified combination (S1811). When it is determined that there is an unspecified combination, the processing returns to the processing illustrated in S1807 and the above-described processing is repeated.

In the meantime, when it is determined that there is no unspecified combination, the linking unit 1415 executes the linking processing (S1813). In the linking processing, the linking unit 1415 updates the association between the person ID and the terminal ID based on the updated combination likelihood table.

Figure 34:
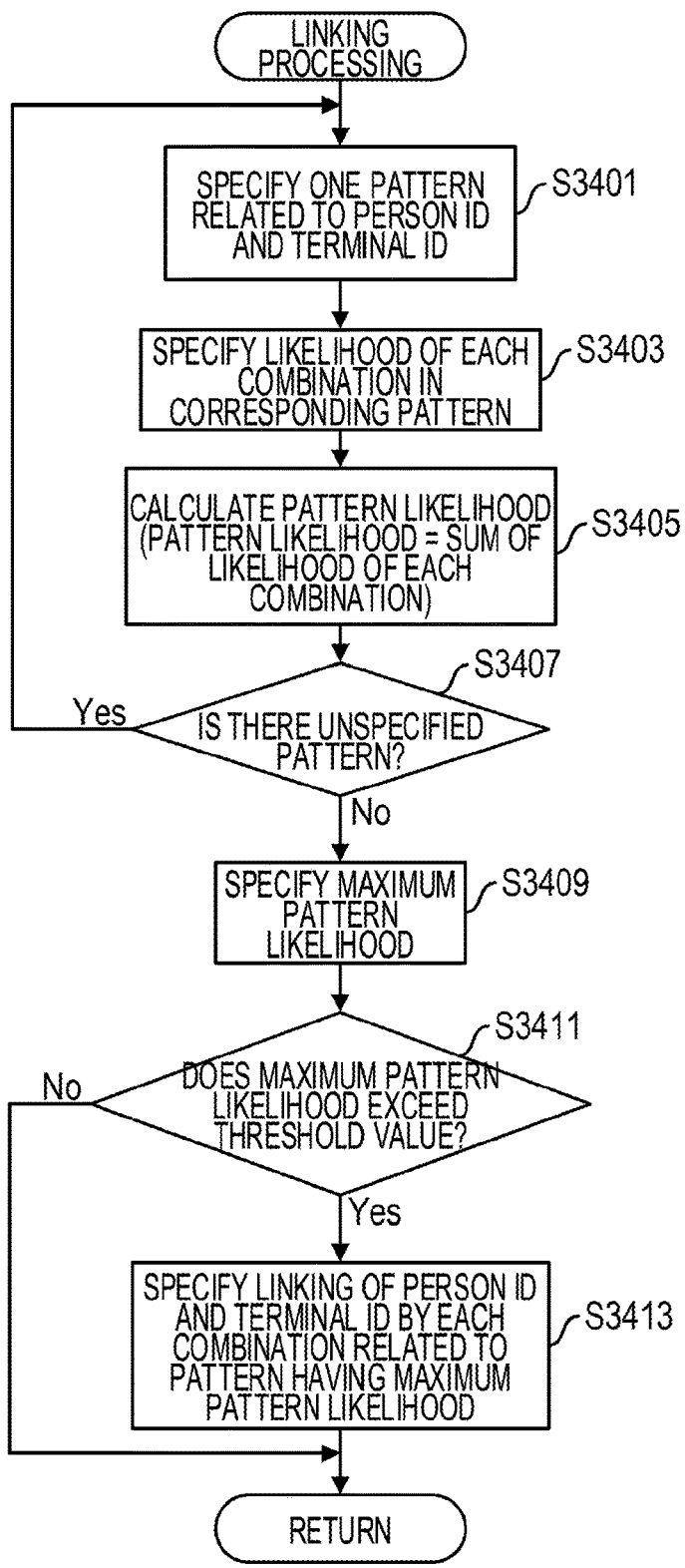
FIG. 34 is a diagram illustrating an example of a linking processing flow.

FIG. 34 illustrates an example of the linking processing flow. The linking unit 1415 specifies one pattern related to the combination of the person ID and the terminal ID (S3401). More specifically, the linking unit 1415 generates the above-described pattern table and sequentially processes the record in the pattern table.

The linking unit 1415 specifies the likelihood of each combination in the pattern based on the combination likelihood table (S3403). Further, the linking unit 1415 calculates the pattern likelihood (S3405). As described above, the pattern likelihood is the sum of the likelihood of each combination in the pattern.

The linking unit 1415 determines whether there is an unspecified pattern (S3407). When it is determined that there is an unspecified pattern, the processing returns to the processing illustrated in S3401 and the above-described processing is repeated.

In the meantime, when it is determined that there is no unspecified pattern, the linking unit 1415 specifies the maximum pattern likelihood of the pattern likelihood in each combination (S3409). Then, the linking unit 1415 determines whether the maximum pattern likelihood exceeds the threshold value (S3411).

When it is determined that the maximum pattern likelihood does not exceed the threshold value, the linking processing is terminated without updating the linking. That is, the current linkage table is maintained.

In the meantime, when it is determined that the maximum pattern likelihood exceeds the threshold value, the linking unit 1415 associates the person ID and the terminal ID with the combination of the patterns having the maximum pattern likelihood (S3413). More specifically, a linkage table is generated by linking the person ID and the terminal ID of each combination. When the linking processing is completed, the processing returned to the second routine processing of a caller.

The description of FIG. 18 is referred to again. When the linking processing is finished, the output unit 1417 outputs a linkage table (S1815). The output unit 1417 transmits the linkage table to the person event device 201, the terminal event device 203, or another server device, for example, via the transmitting unit 1403. However, the processing of S1815 may be omitted. Then, the processing returns to the processing illustrated in S3905 and the above-described processing is repeated.

According to the present embodiment, it is possible to determine the corresponding relationship between the person 101 and the terminal 103 more quickly by transmitting only the actual event.

Second Embodiment

In the present embodiment, an example of repeating the generation of a pseudo-event is described only for a certain period of time after receiving the actual event.

When the actual event is erroneous, the pseudo-event is also erroneous. Therefore, when the person event device 201 and the terminal event device 203, which have relatively high error rates, are used, the accuracy of the likelihood is caused not to become lower considering the fact that the actual event is erroneous.

Figure 35:
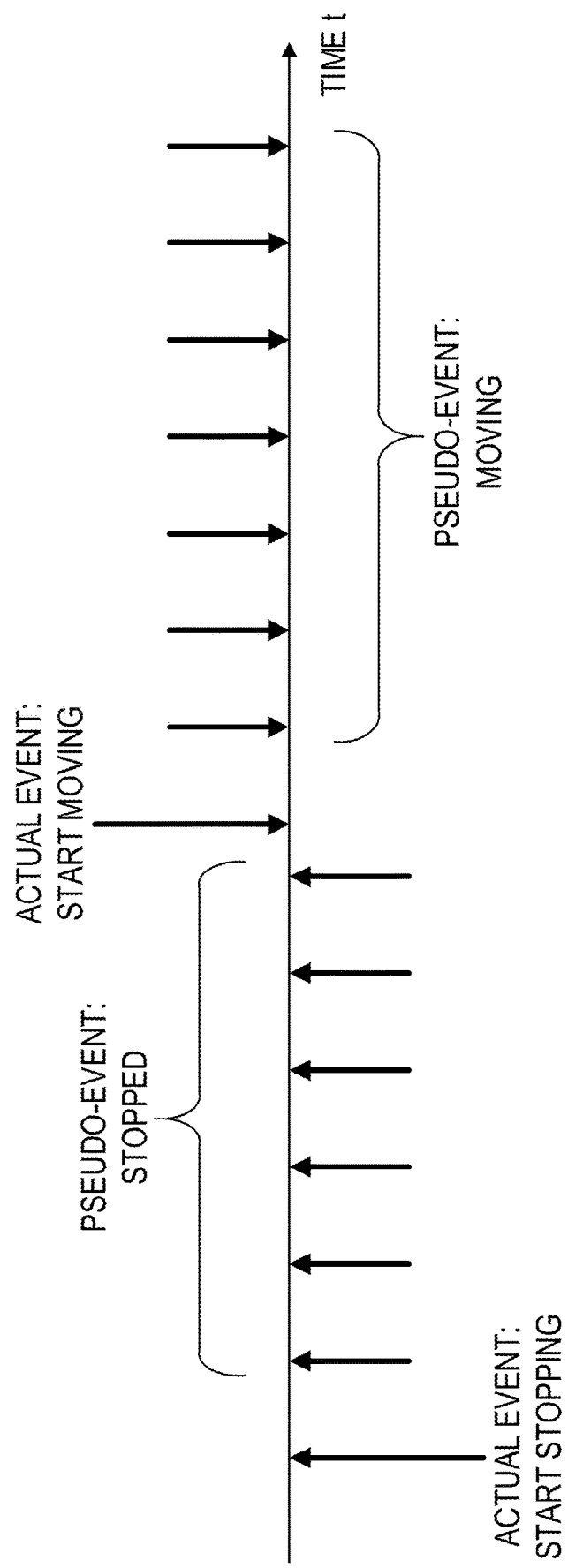
FIG. 35 is a diagram illustrating the generation timing of a pseudo-event in a second embodiment.

Specifically, no pseudo-event is generated after a certain period of time has elapsed since the actual event was received, as illustrated in the dashed line box in FIG. 35. In this way, it is possible to limit the chance of calculating the likelihood based on pseudo-events, thereby preventing the spread of adverse effects caused by erroneous actual events.

Figure 36A:
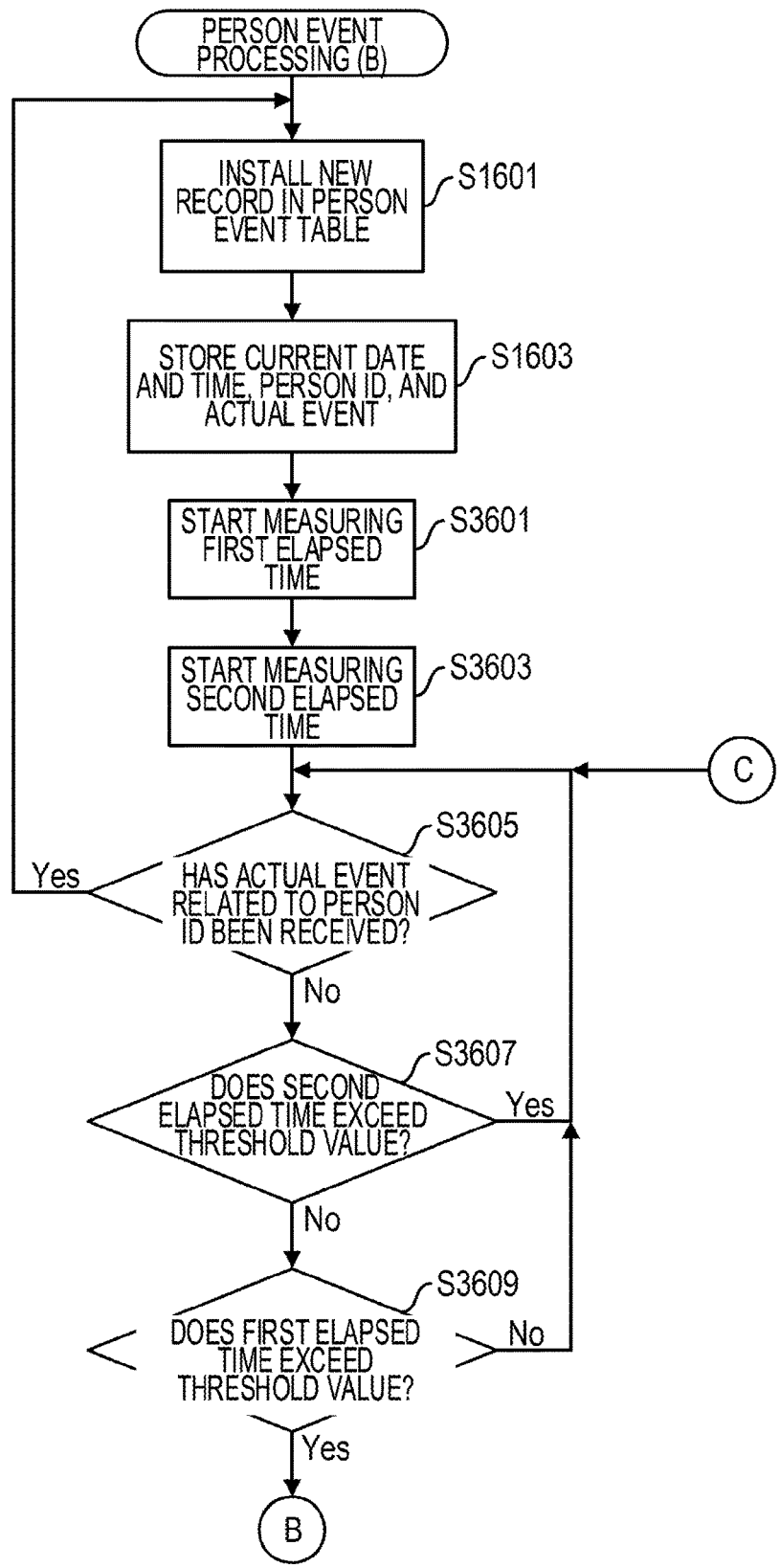
FIG. 36A is a diagram illustrating a person event processing (B) flow.

In the present embodiment, a person event processing (B) is executed instead of the person event processing (A). FIG. 36A illustrates the person event processing (B) flow. The processing in S1601 and S1603 is the same as in FIG. 16.

The first generating unit 1407 starts measuring a first elapsed time (S3601). The first elapsed time is used to specify the timing for generating pseudo-events. When the first elapsed time has already been measured, the first elapsed time measurement is restarted. Further, the first generating unit 1407 starts measuring a second elapsed time (S3603). The second elapsed time is used to specify the timing for specifying the generation of pseudo-events. When the second elapsed time has already been measured, the second elapsed time measurement is restarted.

The first receiving unit 1405 determines whether the receiving unit 1401 has received the actual event related to the person ID (S3605). When it is determined that the actual event related to the person ID has been received, the processing returns to S1601 and the above-described processing is repeated.

In the meantime, when it is determined that the actual event related to the person ID has not been received, the first generating unit 1407 determines whether the second elapsed time exceeds the threshold value (S3607). When it is determined that the second elapsed time exceeds the threshold value, the pseudo-event is not generated, and the processing described in S3605 returns to the processing described above.

In the meantime, when it is determined that the second elapsed time does not exceed the threshold value, the first generating unit 1407 determines whether the first elapsed time exceeds the threshold value (S3609). When it is determined that the first elapsed time does not exceed the threshold value, the processing returns to the processing illustrated in S3605 and the above-described processing is repeated because the timing for generating the pseudo-event has not been reached.

Figure 36B:
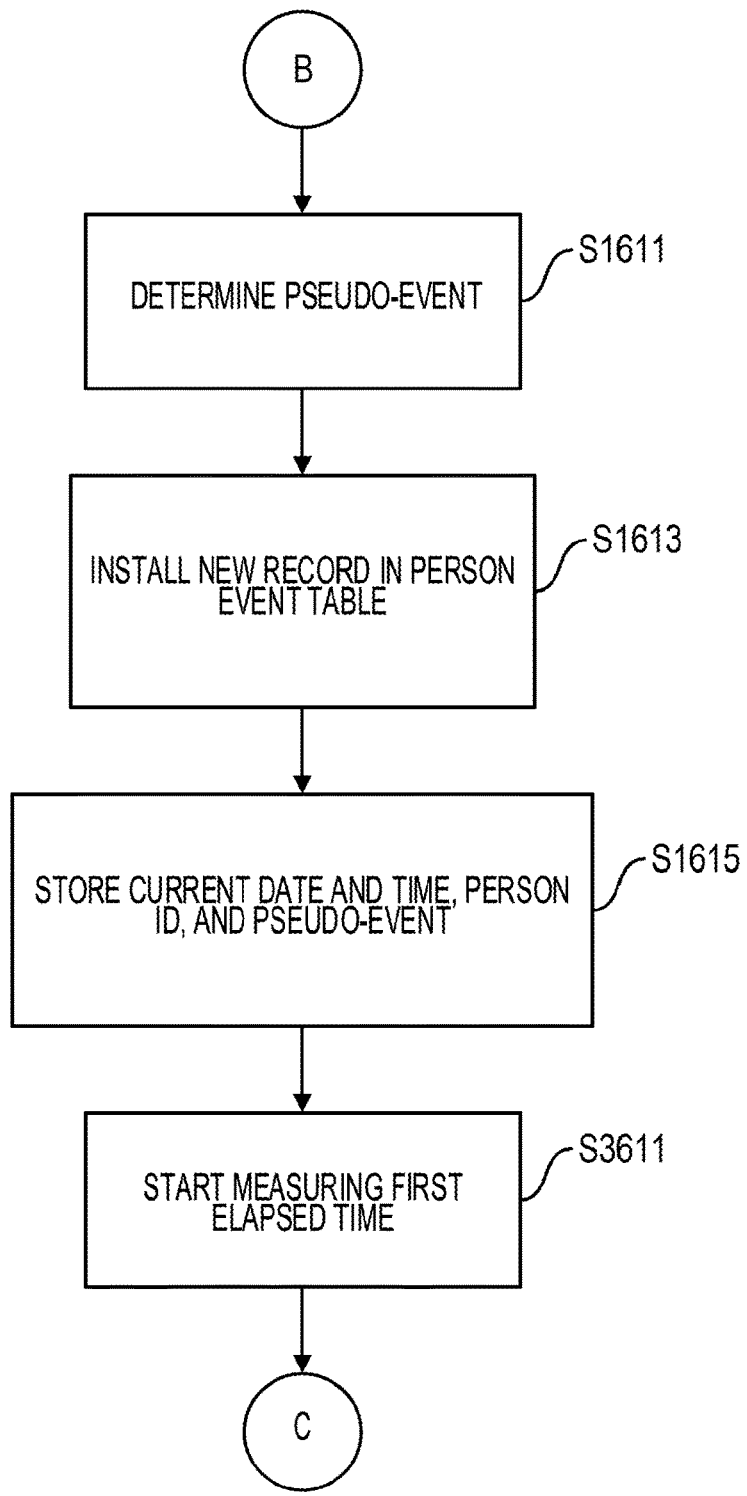
FIG. 36B is a diagram illustrating a person event processing (B) flow.

In the meantime, when it is determined that the first elapsed time exceeds the threshold value, the processing returns to the processing of S1611 illustrated in FIG. 36B via a terminal B.

The processing of S1611 to S1615 illustrated in FIG. 36B is the same as that of FIG. 16. The first generating unit 1407 starts measuring the first elapsed time (S3611). When the first elapsed time has already been measured, the first elapsed time measurement is restarted. Then, the processing returns to the processing of S3605 illustrated in FIG. 36A via a terminal C.

Figure 37A:
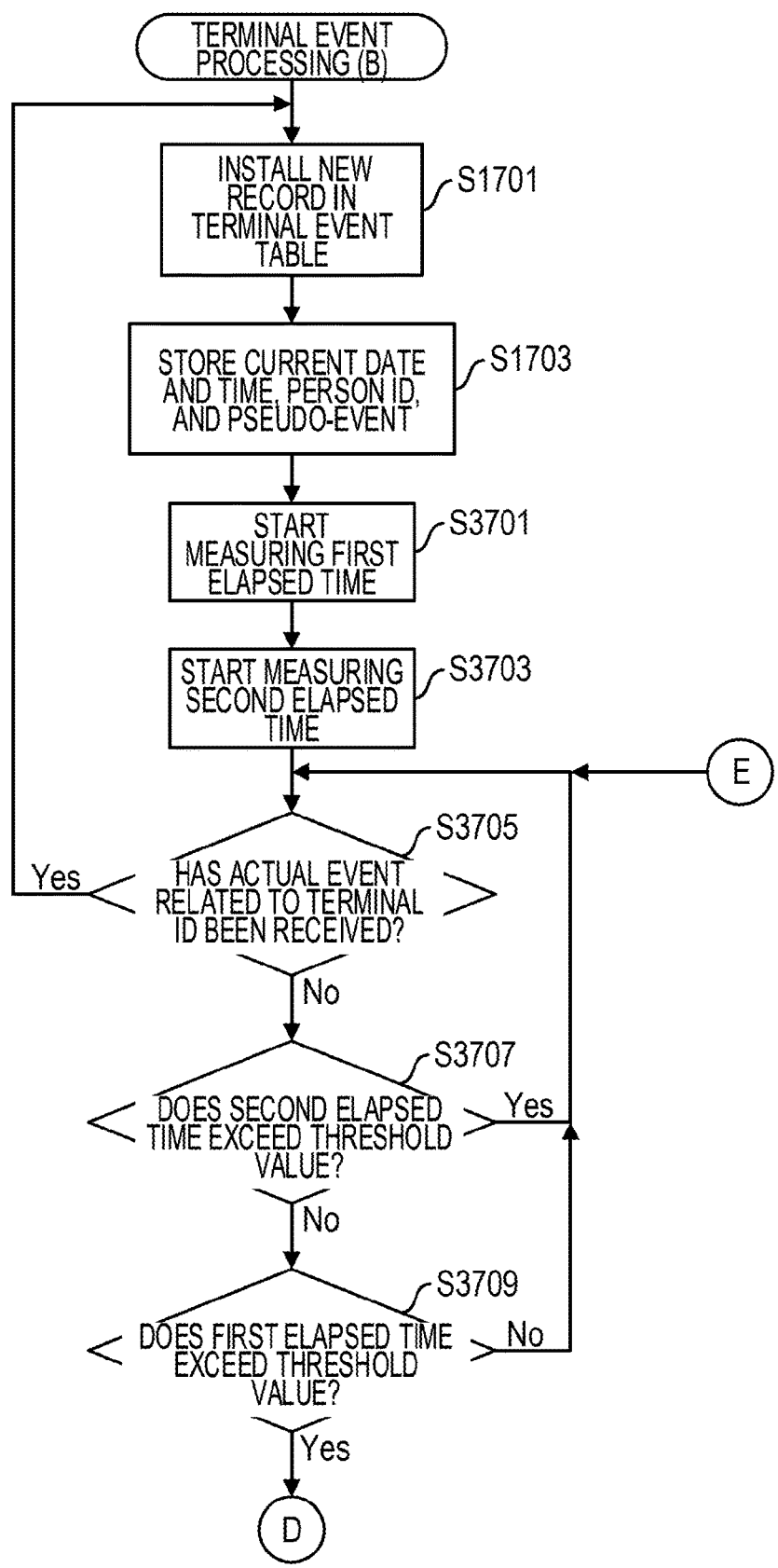
FIG. 37A is a diagram illustrating a terminal event processing (B) flow.

Further, in the present embodiment, a terminal event processing (B) is performed instead of a terminal event processing (A). FIG. 37A illustrates the terminal event processing (B) flow. The processing in S1701 and S1703 is the same as in FIG. 17.

The second generating unit 1411 starts measuring the first elapsed time (S3701). The first elapsed time is used to specify the timing for generating pseudo-events as described above. The second generating unit 1411 starts measuring the second elapsed time (S3703). The second elapsed time is used to specify the timing to end the occurrence of the pseudo-event as described above.

The second receiving unit 1409 determines whether the receiving unit 1401 has received the actual event related to the terminal ID (S3705). When it is determined that the actual event related to the terminal ID has been received, the processing returns to the processing illustrated in S1701 and the above-described processing is repeated.

In the meantime, when it is determined that the actual event related to the terminal ID has not been received, the second generating unit 1411 determines whether the second elapsed time exceeds the threshold value (S3707). When it is determined that the second elapsed time exceeds the threshold value, the pseudo-event is not generated, and the processing described in S3705 returns to the above-described process.

In the meantime, when it is determined that the second elapsed time does not exceed the threshold value, the second generating unit 1411 determines whether the first elapsed time exceeds the threshold value (S3709). When it is determined that the first elapsed time does not exceed the threshold value, the processing returns to the processing illustrated in S3705 and the above-described processing is repeated because the timing for generating the pseudo-event has not been reached.

Figure 37B:
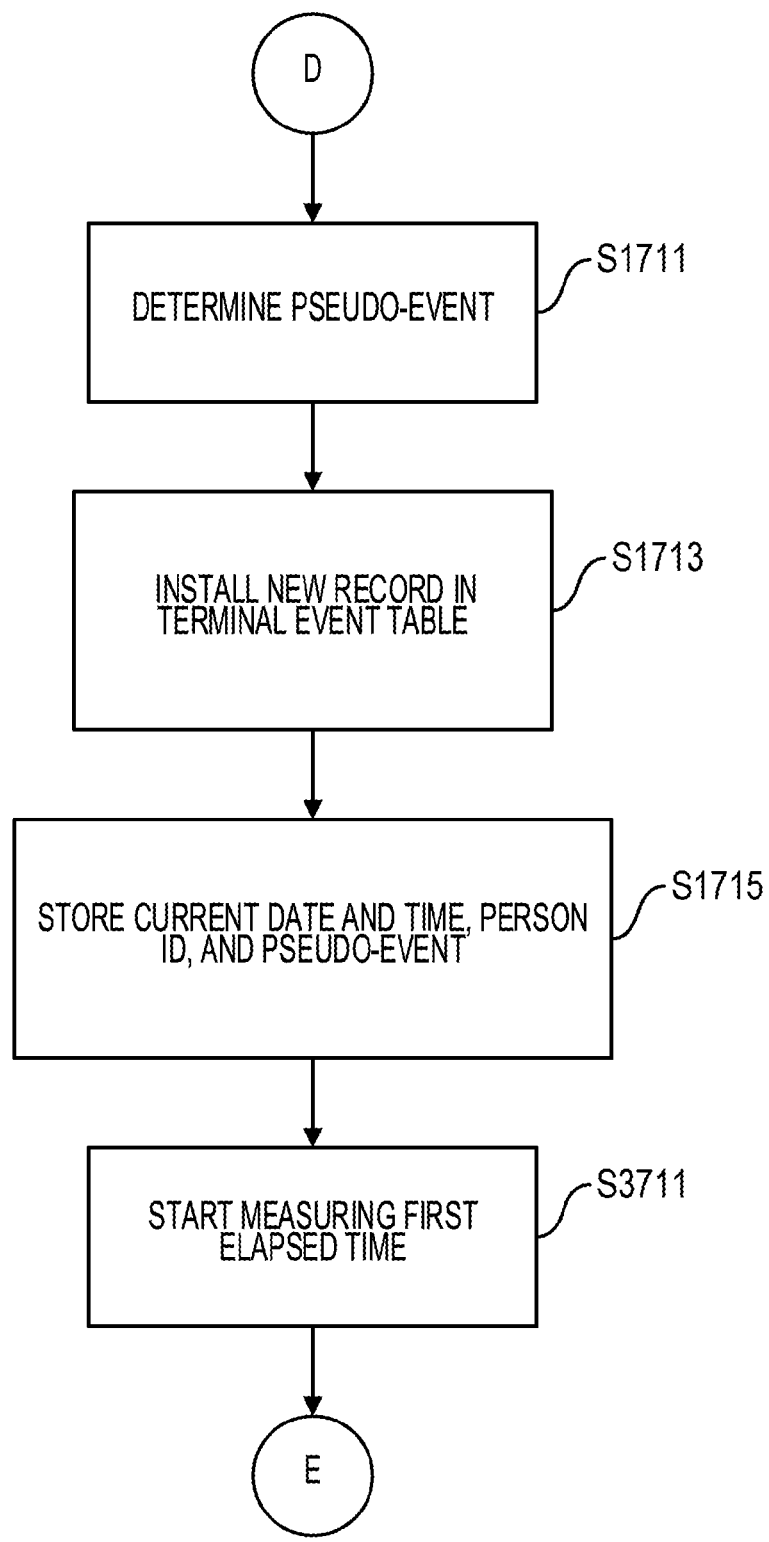
FIG. 37B is a diagram illustrating a terminal event processing (B) flow.

In the meantime, when it is determined that the first elapsed time exceeds the threshold value, the processing proceeds to the processing of S1711 illustrated in FIG. 37B via a terminal D.

The processing of S1711 to S1715 illustrated in FIG. 37B is the same as that of FIG. 17. The second generating unit 1411 starts measuring the first elapsed time (S3711). When the first elapsed time has already been measured, the first elapsed time measurement is restarted. Then, the processing returns to the processing of S3705 illustrated in FIG. 37A through a terminal E.

According to the present embodiment, when an actual event is erroneous, the error of the likelihood due to the influence may be suppressed, and the accuracy of the linking may be improved.

Third Embodiment

In the present embodiment, descriptions will be made of an example of repeating the generation of a pseudo-event while increasing an interval for generating the pseudo-event.

When the recent actual event is not switched, the pseudo-events based on the actual event are the same. Therefore, when the timing at which a pseudo-event occurs is advanced, the result of linking is quickly obtained. In the case of using the person event device 201 and the terminal event device 203 in which the actual event is less likely to be an error, there is little risk that the accuracy of the likelihood is low even if the timing of the occurrence of the pseudo-event is advanced.

Figure 38:
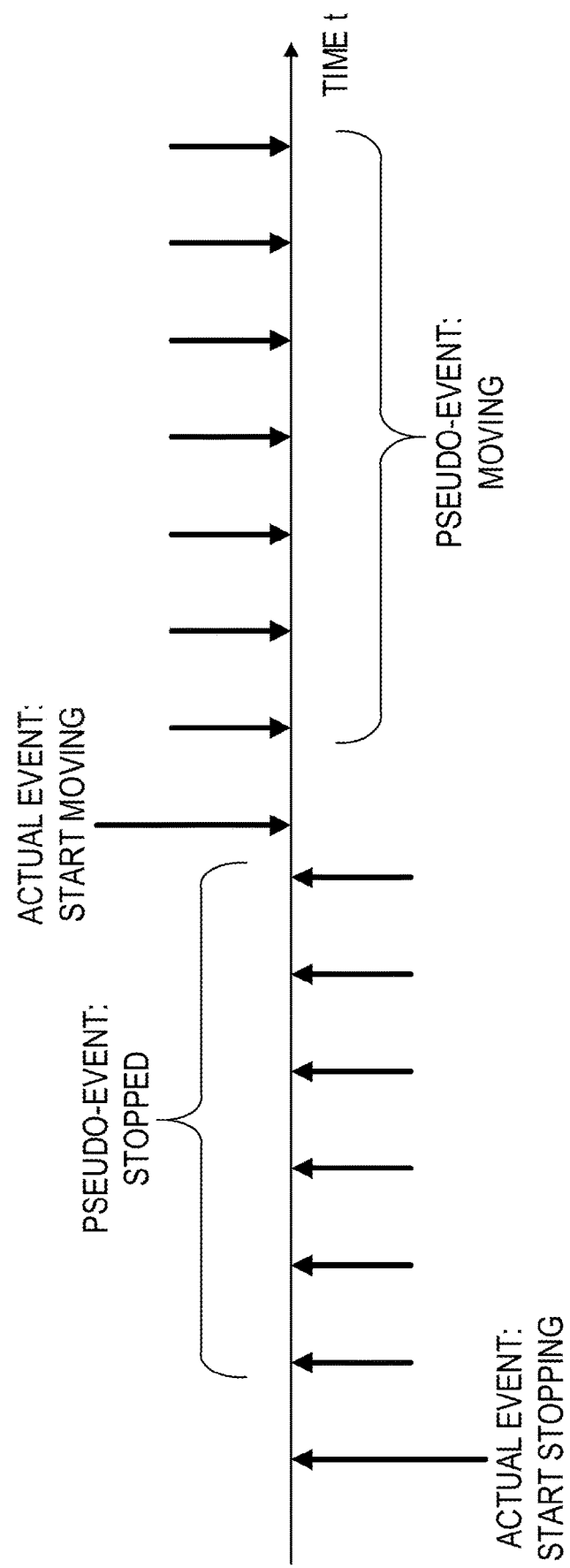
FIG. 38 is a diagram illustrating the generation timing of a pseudo-event in a third embodiment.

FIG. 38 illustrates the generation timing of the pseudo-events in the third embodiment. As illustrated, in the present embodiment, the interval is the narrowest immediately after the actual event occurs, and the interval is widened stepwise.

Figure 39:
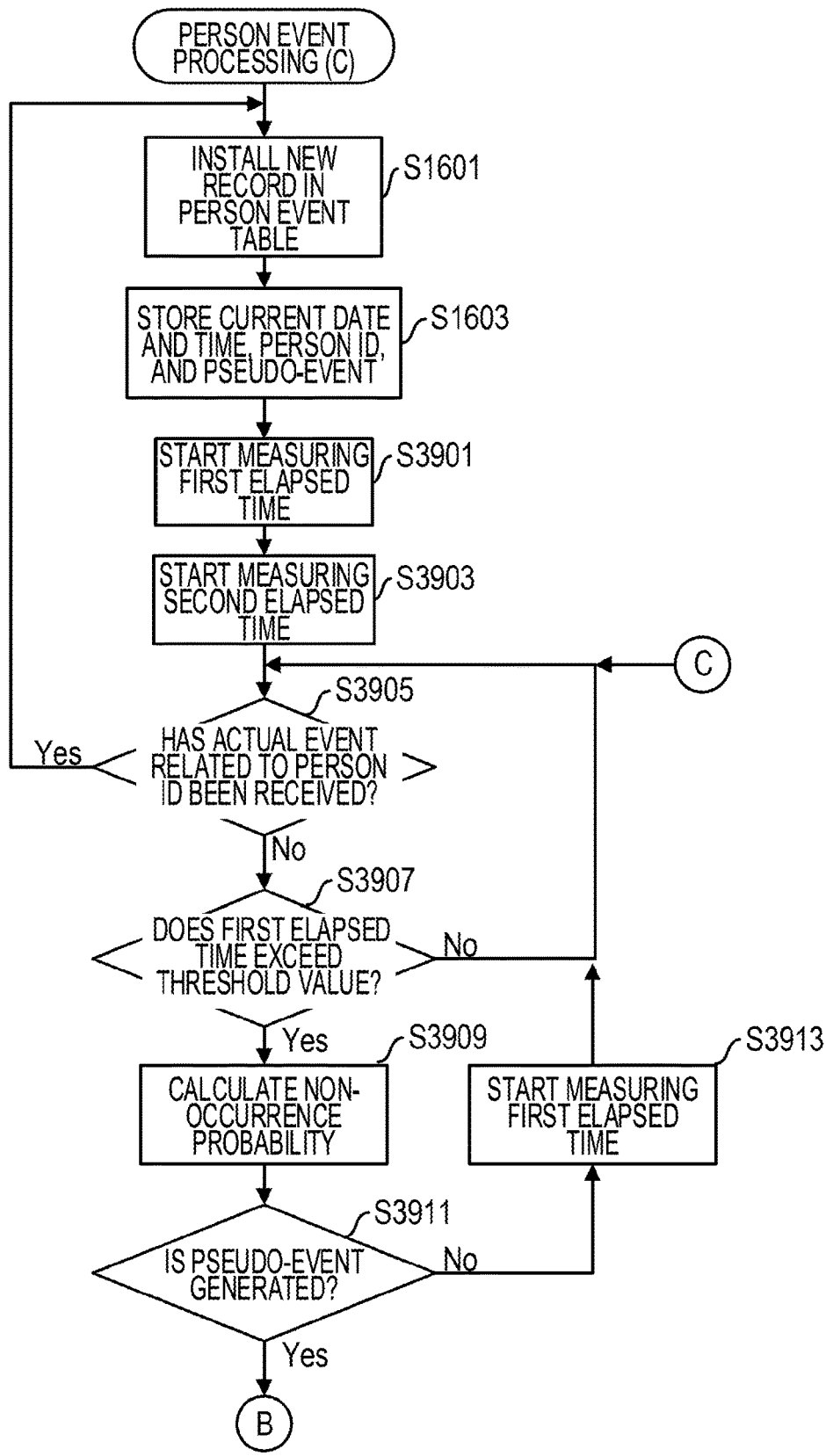
FIG. 39 is a diagram illustrating a person event processing (C) flow.

In the present embodiment, a person event processing (C) is executed instead of the person event processing (A). FIG. 39 illustrates the person event processing (C) flow. The processing in S1601 and S1603 is the same as in FIG. 16.

The first generating unit 1407 starts measuring the first elapsed time (S3901). The first elapsed time is used to specify candidates for timing to generate pseudo-events. When the first elapsed time has already been measured, the first elapsed time measurement is restarted. The first generating unit 1407 starts measuring the second elapsed time (S3903). The second elapsed time is used to calculate non-occurrence probability (to be described later). When the second elapsed time has already been measured, the second elapsed time measurement is restarted.

The first receiving unit 1405 determines whether the receiving unit 1401 has received the actual event related to the person ID (S3905). When it is determined that the actual event related to the person ID has been received, the processing returns to S1601 and the above-described processing is repeated.

In the meantime, when it is determined that the actual event related to the person ID has not been received, the first generating unit 1407 determines whether the first elapsed time exceeds the threshold value (S3907). When it is determined that the first elapsed time does not exceed the threshold value, the processing returns to the processing illustrated in S3905 and the above-described processing is repeated because the timing for generating the pseudo-event has not been reached.

In the meantime, when it is determined that the first elapsed time exceeds the threshold value, the first generating unit 1407 calculates non-generation probability (S3909). Non-occurrence probability is the probability of not generating a pseudo-event. The non-occurrence probability is calculated according to the following formula.

$$p(t) = \gamma e^{-\frac{t-t_0}{T}} \quad \text{Equation 1}$$

The symbol t is the current time on the current day. The symbol $t_0$ is the date at which the recent actual event was acquired. In other words, $t-t_0$ corresponds to the second elapsed time. The symbol T is the length of time during which pseudo-events are generated. The symbol γ is the value indicating the degree of reliability in the recent actual event. This value is assumed to be added to the actual event.

The first generating unit 1407 determines whether the pseudo-event is generated based on the non-generation probability (S3911).

When it is determined that the pseudo-event is not to be generated, the first generating unit 1407 starts measuring the first elapsed time (S3913). When the first elapsed time has already been measured, the first elapsed time measurement is restarted. Then, the processing returns to the processing illustrated in S3905 and the above-described processing is repeated.

In the meantime, when it is determined that the pseudo-event is generated, the processing goes to the processing of S1611 illustrated in FIG. 36B via the terminal B. The processing illustrated in FIG. 36B is the same as in the case of the second embodiment.

Figure 40:
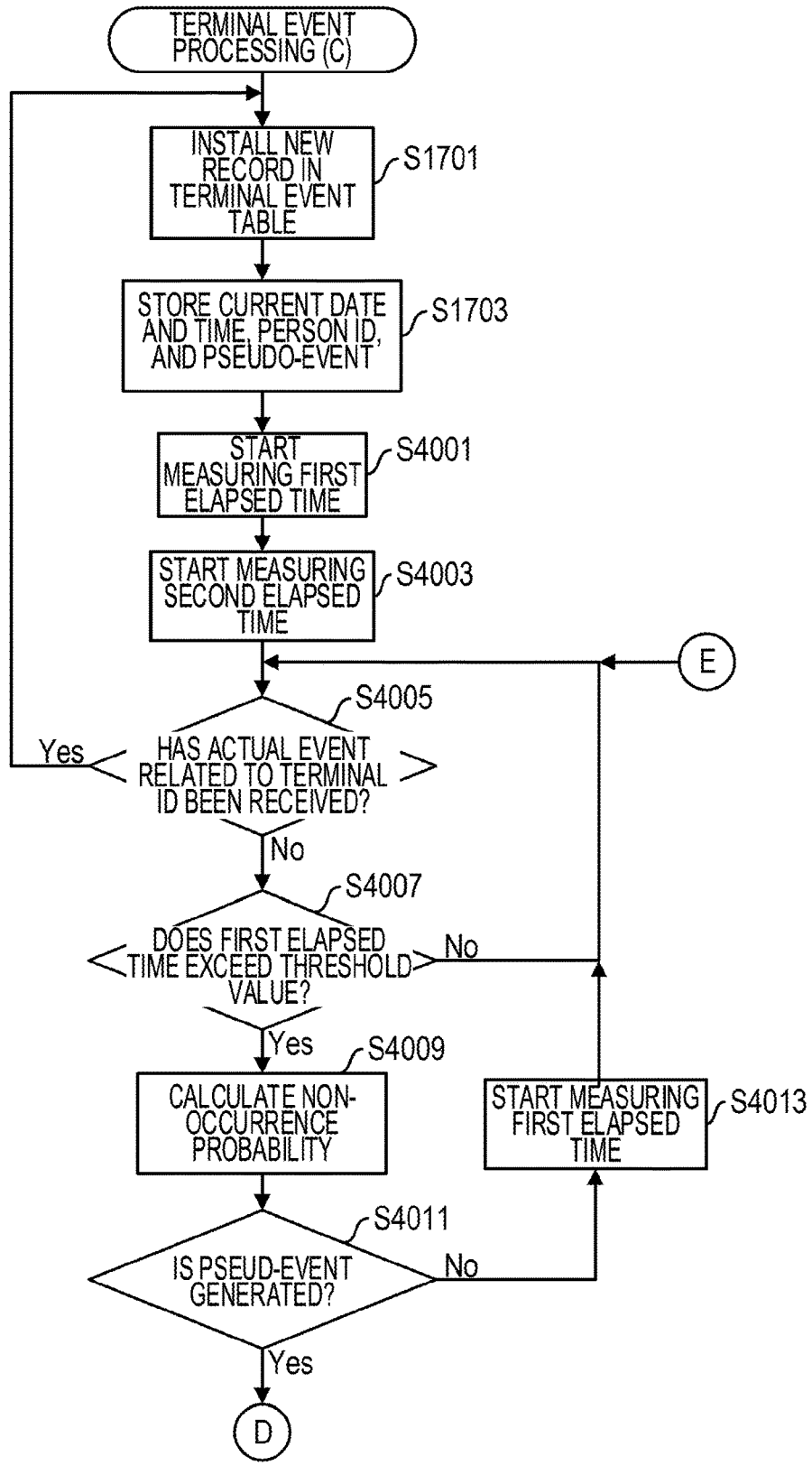
FIG. 40 is a diagram illustrating a terminal event processing (C) flow.

In the present embodiment, the terminal event processing (C) is executed instead of the terminal event processing (A). FIG. 40 illustrates the terminal event processing (C) flow. The processing in S1701 and S1703 is the same as in FIG. 17.

The second generating unit 1411 starts measuring the first elapsed time (S4001). The first elapsed time is used to specify the candidates for the timing in which the event occurs as described above. When the first elapsed time has already been measured, the first elapsed time measurement is restarted. The second generating unit 1411 starts measuring the second elapsed time (S4003). The second elapsed time is used to calculate the non-occurrence probability as described above. When the second elapsed time has already been measured, the second elapsed time measurement is restarted.

The second receiving unit 1409 determines whether the receiving unit 1401 has received the actual event related to the terminal ID (S4005). When it is determined that the actual event related to the terminal ID has been received, the processing returns to the processing illustrated in S1701 and the above-described processing is repeated.

In the meantime, when it is determined that the actual event related to the terminal ID has not been received, the second generating unit 1411 determines whether the first elapsed time exceeds the threshold value (S4007). When it is determined that the first elapsed time does not exceed the threshold value, the processing returns to the processing illustrated in S4005 and the above-described processing is repeated because the timing for generating the pseudo-event has not been reached.

In the meantime, when it is determined that the first elapsed time exceeds the threshold value, the second generating unit 1411 calculates the non-generation probability (S4009). The calculation of the non-occurrence probability is the same as in the case of the processing illustrated in S3909 in FIG. 39.

The second generating unit 1411 determines whether the pseudo-event is generated based on the non-occurrence probability (S4011).

When it is determined that the pseudo-event is not to be generated, the second generating unit 1411 starts measuring the first elapsed time (S4013). When the first elapsed time has already been measured, the first elapsed time measurement is restarted. Then, the processing returns to the processing illustrated in S4005 and the above-described processing is repeated.

In the meantime, when it is determined that the pseudo-event is generated, the processing goes to the processing of S1711 illustrated in FIG. 37B via the terminal D. The processing illustrated in FIG. 37B is the same as that in the second embodiment.

According to the present embodiment, the cumulative change of the likelihood may be hastened earlier and more quickly by advancing the generation timing of the pseudo-event.

Fourth Embodiment

In the present embodiment, descriptions will be made of an example of repeating the generation of a pseudo-event while increasing an interval for generating the pseudo-event after repeating the generation of the pseudo-event while decreasing the interval for generating the pseudo-event every time.

As illustrated in the third embodiment, when the generation timing of the pseudo-event is advanced, there is a risk that the accuracy of the likelihood is lowered due to the influence of the actual event of an error. When the person event device 201 and the terminal event device 203, of which the actual events are likely to be erroneous, are used, the generation timing of the pseudo-event becomes more dense at the point in time when the actual event of the error passes through a period in which it is likely to be corrected.

In this example, when an actual event which is an error occurs, it is assumed that an actual event of an error is likely to be corrected in a predetermined period after an actual event occurs, considering that many separate actual events occur consecutively.

Figure 41:
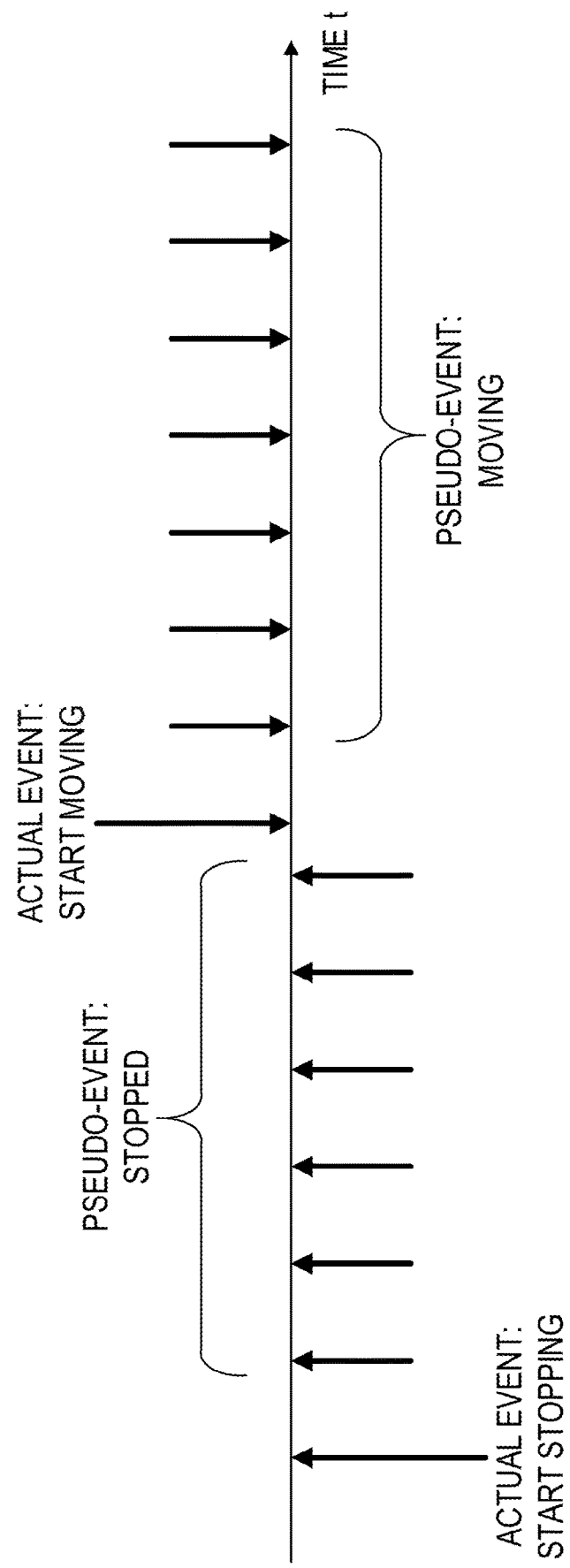
FIG. 41 is a diagram illustrating the generation timing of a pseudo-event in a fourth embodiment.

FIG. 41 illustrates the generation timing of a pseudo-event in the fourth embodiment. In the present embodiment, the interval is narrowed stepwise immediately after the actual event occurs. In addition, the interval is widened stepwise from a certain point in time.

In the processing of S3909 illustrated in FIG. 39 and the processing of S4009 illustrated in FIG. 40 in the third embodiment, the non-occurrence probability is calculated according to the following equation.

$$p(t) = \gamma \frac{\lambda^{(t-t_0)} e^{-\lambda}}{(t-t_0)!} \qquad \text{Equation 2}$$

Each parameter is the same as in the case of the third embodiment. This equation is based on the Poisson distribution. It is also possible to use an equation based on another distribution (e.g., a gamma distribution). The other processes are the same as in the third embodiment.

According to the present embodiment, the generation of pseudo-events is concentrated at a time when the probability of correcting the actual event is lowered so that the cumulative change of the likelihood is accelerated precisely and the correct linking may be performed more quickly.

It is to be noted that the above-described person is an example of a moving object, and the present embodiment may be applied to a moving object other than a person (e.g., an animal or an automobile). Further, the above-described terminal is an example of a device for measuring the inertia of a moving object and may be applied to a device other than a terminal (e.g., an automobile or a home electric appliance).

Although embodiments of the present disclosure have been described above, the present disclosure is not limited to these embodiments. For example, the above-described functional block configuration may not match the program module configuration.

In addition, the configuration of each storage area described above is merely an example, and it should not be configured as described above. In addition, when the processing results do not change even in the processing flow, the order of processing may be changed or a plurality of processing may be executed in parallel.

Further, the above-described monitoring apparatus 205 is a computer device, and a memory 2501, a central processing unit (CPU) 2503, a hard disk drive (HDD) 2505, a display controller 2507 connected to a display device 2509, a drive device 2513 for a removable disk 2511, an input device 2515, and a communication controller 2517 for connecting to the network are connected via a bus 2519. An operating system (OS) and an application program for executing the processing in the present embodiment are stored in the HDD 2505, and when executed by the CPU 2503, are read from the HDD 2505 to the memory 2501. The CPU 2503 controls the display controller 2507, the communication controller 2517, and the drive device 2513 according to the processing contents of the application program to perform a predetermined operation. Further, the data in processing is stored mainly in the memory 2501, but it may be stored in the HDD 2505. In the embodiment of the present disclosure, the application program for executing the above-described processing is stored in the computer-readable removable disk 2511, distributed, and installed in the HDD 2505 from the drive device 2513. The application program may be installed in the HDD 2505 through the network such as the Internet and the communication controller 2517. Such a computer device implements various functions as described above by organically cooperating with hardware such as the CPU 2503 and the memory 2501 described above and programs such as an OS and an application program.

A summary of the embodiments of the present disclosure described above will be given below.

An information processing method according to the present embodiment includes: (A) after receiving a first event that is generated based on a measurement result by a first sensor monitoring a first object and indicates a transition to a first state, generating a second event that indicates the continuation of the first state after the transition; (B) after receiving a third event that is generated based on a measurement result by a second sensor monitoring a second object and indicates a transition to a second state, generating a fourth event that indicates the continuation of the second state after the transition; (C) when one of the first event and the second event is synchronized with one of the third event and the fourth event, calculating likelihood in which the first object and the second object are related to each other; and (D) linking the first object and the second object based on the likelihood.

In this way, it is possible to determine the corresponding relationship more quickly with respect to the measurement objects of different sensors by transmitting a small number of events.

It is also possible to repeat the generation of the second event only for a certain period of time after receiving the first event. Further, it is possible to repeat generation of the fourth event only for a certain period of time after receiving the third event.

In this way, when the first event or the third event is erroneous, it is possible to suppress the error of the likelihood due to the influence and improve the accuracy of the linking.

It is also possible to increase an interval between generation of the second event and repeat generation of the second event. Further, it is possible to increase the interval between generation of the fourth event and repeat generation of the fourth event.

In this way, the cumulative change of likelihood may be accelerated and the linking may be performed more quickly by advancing the generation timing of the second event and the fourth event.

It is also possible to repeat generation of the second event while reducing the interval between generation of the second event, and then repeat generation of the second event while increasing the interval at which the second event is generated. It is also possible to repeat generation of the fourth event while reducing the interval at which the fourth event is generated, and then repeat generation of the fourth event while increasing the interval at which the fourth event is generated.

In this way, the generation of the second event and the fourth event is concentrated at a time when the possibility of correcting the first event or the third event is lowered so that the cumulative change of the likelihood is accelerated precisely, and the correct linking may be performed more quickly.

A program to cause a computer to execute the processing by the above-described method may be created and the program may be stored in a computer-readable storage medium such as a flexible disk, a CD-ROM, a magneto-optical disk, a semiconductor memory, and a hard disk or a storage device. Further, the intermediate processing results are generally temporarily stored in a storage device such as a main memory.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. An information processing method, comprising:
    receiving, by a computer, a first event from a first sensor monitoring a first object, the first event indicating a state of the first object;
    storing the first event in a first history stored in a memory;
    generating and storing a second event in the first history repeatedly in absence of another event from the first sensor, the second event indicating the state indicated by the first event;
    receiving a third event from a second sensor monitoring a second object, the third event indicating a state of the second object, the second sensor being different from the first sensor;
    storing the third event in a second history stored in the memory;
    generating and storing a fourth event in the second history repeatedly in absence of another event from the second sensor, the fourth event indicating the state indicated by the third event;
    calculating likelihood that the first object and the second object accompany each other based on the first history and the second history; and
    generating and outputting, when the likelihood exceeds a predetermined threshold value, information in which the first object and the second object are linked to each other.

2. The information processing method according to claim 1, further comprising:
    generating and storing the second event in the first history repeatedly for a predetermined period of time in absence of another event from the first sensor; and
    generating and storing the fourth event in the second history repeatedly for a predetermined period of time in absence of another event from the second sensor.

3. The information processing method according to claim 1, further comprising:
    increasing an interval of generating the second event while generating and storing the second event in the first history repeatedly; and
    increasing an interval of generating the fourth event while generating and storing the fourth event in the second history repeatedly.

4. The information processing method according to claim 3, further comprising:
    reducing the interval of generating the second event after increasing the interval of generating the second event for a predetermined time period; and
    reducing the interval of generating the fourth event after increasing the interval of generating the fourth event for a predetermined time period.

5. A non-transitory computer-readable recording medium having stored therein a program that causes a computer to execute a process, the process comprising:
    receiving a first event from a first sensor monitoring a first object, the first event indicating a state of the first object;
    storing the first event in a first history stored in a memory;
    generating and storing a second event in the first history repeatedly in absence of another event from the first sensor, the second event indicating the state indicated by the first event;
    receiving a third event from a second sensor monitoring a second object, the third event indicating a state of the second object, the second sensor being different from the first sensor;
    storing the third event in a second history stored in the memory;
    generating and storing a fourth event in the second history repeatedly in absence of another event from the second sensor, the fourth event indicating the state indicated by the third event;
    calculating likelihood that the first object and the second object accompany each other based on the first history and the second history; and
    generating and outputting, when the likelihood exceeds a predetermined threshold value, information in which the first object and the second object are linked to each other.

6. An information processing apparatus, comprising:
    a memory; and
    a processor coupled to the memory and the processor configured to:
    receive a first event from a first sensor monitoring a first object, the first event indicating a state of the first object;
    store the first event in a first history stored in the memory;
    generate and store a second event in the first history repeatedly in absence of another event from the first sensor, the second event indicating the state indicated by the first event;
    receive a third event from a second sensor monitoring a second object, the third event indicating a state of the second object, the second sensor being different from the first sensor;
    store the third event in a second history stored in the memory;
    generate and store a fourth event in the second history repeatedly in absence of another event from the second sensor, the fourth event indicating the state indicated by the third event;
    calculate likelihood that the first object and the second object accompany each other based on the first history and the second history; and generate and output, when the likelihood exceeds a predetermined threshold value, information in which the first object and the second object are linked to each other.

* * * * *